(12) United States Patent
Georgiev et al.

(10) Patent No.: US 10,084,958 B2
(45) Date of Patent: Sep. 25, 2018

(54) MULTI-CAMERA SYSTEM USING FOLDED OPTICS FREE FROM PARALLAX AND TILT ARTIFACTS

(71) Applicant: QUALCOMM Incorporated, San Diego, CA (US)

(72) Inventors: Todor Georgiev Georgiev, Sunnyvale, CA (US); Sergiu Radu Goma, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 15/015,573

(22) Filed: Feb. 4, 2016

(65) Prior Publication Data

US 2016/0198087 A1    Jul. 7, 2016

Related U.S. Application Data

(63) Continuation of application No. 14/571,149, filed on Dec. 15, 2014, now Pat. No. 9,294,672.

(Continued)

(51) Int. Cl.
*H04N 5/225* (2006.01)
*H04N 5/232* (2006.01)
(Continued)

(52) U.S. Cl.
CPC ......... *H04N 5/23232* (2013.01); *G03B 17/00* (2013.01); *G03B 17/17* (2013.01);
(Continued)

(58) Field of Classification Search
CPC ...... G03B 17/17; H04N 5/2171; H04N 5/225; H04N 5/2253; H04N 5/2254;
(Continued)

(56) References Cited

U.S. PATENT DOCUMENTS 3,698,803 A   10/1972 Toshio
4,114,171 A    9/1978 Altman
(Continued)

FOREIGN PATENT DOCUMENTS

CN   101046534 A   10/2007
CN   101201459 A    6/2008
(Continued)

OTHER PUBLICATIONS

Chowdhury et al, Challenges of Megapixel Camera Module Assembly and Test, 2005.*
(Continued)

*Primary Examiner* — Shan E Elahi
(74) *Attorney, Agent, or Firm* — Paradice and Li LLP

(57) ABSTRACT

Aspects relate to an array camera exhibiting little or no parallax artifacts in captured images. For example, the planes of the central prism of the array camera can intersect at an apex defining the vertical axis of symmetry of the system. The apex can serve as a point of intersection for the optical axes of the sensors in the array. Each sensor in the array "sees" a portion of the image scene using a corresponding facet of the central prism, and accordingly each individual sensor/facet pair represents only a sub-aperture of the total array camera. The complete array camera has a synthetic aperture generated based on the sum of all individual aperture rays.

27 Claims, 15 Drawing Sheets

Related U.S. Application Data

(60) Provisional application No. 62/015,319, filed on Jun. 20, 2014.

(51) Int. Cl.
  *G03B 17/17* (2006.01)
  *G03B 17/00* (2006.01)
  *H04N 5/217* (2011.01)

(52) U.S. Cl.
  CPC ........... *H04N 5/225* (2013.01); *H04N 5/2253* (2013.01); *H04N 5/2254* (2013.01); *H04N 5/2258* (2013.01); *H04N 5/232* (2013.01); *H04N 5/23238* (2013.01); *H04N 5/2171* (2013.01); *Y10T 29/49828* (2015.01)

(58) Field of Classification Search
  CPC .. H04N 5/2258; H04N 5/232; H04N 5/23232; H04N 5/23238; Y10T 29/49828
  USPC ......................................................... 348/360
  See application file for complete search history.

(56) References Cited

U.S. PATENT DOCUMENTS

| | | | |
|---|---|---|---|
| 4,437,745 A | 3/1984 | Hajnal | |
| 4,639,586 A | 1/1987 | Fender et al. | |
| 4,740,780 A | 4/1988 | Brown et al. | |
| 4,751,570 A | 6/1988 | Robinson | |
| 4,890,314 A | 12/1989 | Judd et al. | |
| 5,012,273 A | 4/1991 | Nakamura et al. | |
| 5,016,109 A | 5/1991 | Gaylord | |
| 5,063,441 A | 11/1991 | Lipton et al. | |
| 5,142,357 A | 8/1992 | Lipton et al. | |
| 5,194,959 A * | 3/1993 | Kaneko | G02B 13/16 348/335 |
| 5,207,000 A | 5/1993 | Chang et al. | |
| 5,231,461 A | 7/1993 | Silvergate et al. | |
| 5,243,413 A | 9/1993 | Gitlin et al. | |
| 5,313,542 A | 5/1994 | Castonguay | |
| 5,475,617 A | 12/1995 | Castonguay | |
| 5,506,913 A | 4/1996 | Ibison et al. | |
| 5,539,483 A | 7/1996 | Nalwa | |
| 5,606,627 A | 2/1997 | Kuo | |
| 5,614,941 A | 3/1997 | Hines | |
| 5,640,222 A | 6/1997 | Paul | |
| 5,642,299 A | 6/1997 | Hardin et al. | |
| 5,686,960 A | 11/1997 | Sussman et al. | |
| 5,721,585 A | 2/1998 | Keast et al. | |
| 5,734,507 A | 3/1998 | Harvey | |
| 5,745,305 A | 4/1998 | Nalwa | |
| 5,760,846 A | 6/1998 | Lee | |
| 5,793,527 A * | 8/1998 | Nalwa | G02B 27/1066 359/403 |
| 5,798,791 A | 8/1998 | Katayama et al. | |
| 5,903,306 A | 5/1999 | Heckendorn et al. | |
| 5,926,411 A | 7/1999 | Russell | |
| 5,990,934 A | 11/1999 | Nalwa | |
| 6,111,702 A | 8/2000 | Nalwa | |
| 6,115,176 A | 9/2000 | Nalwa | |
| 6,128,143 A | 10/2000 | Nalwa | |
| 6,141,034 A | 10/2000 | McCutchen | |
| 6,141,145 A | 10/2000 | Nalwa | |
| 6,144,501 A | 11/2000 | Nalwa | |
| 6,195,204 B1 | 2/2001 | Nalwa | |
| 6,219,090 B1 | 4/2001 | Nalwa | |
| 6,285,365 B1 | 9/2001 | Nalwa | |
| 6,356,397 B1 | 3/2002 | Nalwa | |
| 6,421,185 B1 * | 7/2002 | Wick | G02B 13/06 359/637 |
| 6,611,289 B1 | 8/2003 | Yu et al. | |
| 6,628,897 B2 | 9/2003 | Suzuki | |
| 6,650,774 B1 | 11/2003 | Szeliski | |
| 6,700,711 B2 | 3/2004 | Nalwa | |
| 6,701,081 B1 | 3/2004 | Dwyer et al. | |
| 6,768,509 B1 | 7/2004 | Bradski et al. | |
| 6,775,437 B2 | 8/2004 | Kazarinov et al. | |
| 6,782,137 B1 | 8/2004 | Avinash | |
| 6,798,406 B1 | 9/2004 | Jones et al. | |
| 6,809,887 B1 | 10/2004 | Gao et al. | |
| 6,850,279 B1 | 2/2005 | Scherling | |
| 6,855,111 B2 | 2/2005 | Yokoi et al. | |
| 6,861,633 B2 | 3/2005 | Osborn | |
| 6,862,364 B1 | 3/2005 | Berestov | |
| 6,987,534 B1 | 1/2006 | Seta | |
| 6,992,700 B1 | 1/2006 | Sato et al. | |
| 7,006,123 B2 | 2/2006 | Yoshikawa et al. | |
| 7,039,292 B1 | 5/2006 | Breiholz | |
| 7,084,904 B2 | 8/2006 | Liu et al. | |
| 7,116,351 B2 | 10/2006 | Yoshikawa | |
| 7,215,479 B1 | 5/2007 | Bakin | |
| 7,253,394 B2 | 8/2007 | Kang | |
| 7,271,803 B2 | 9/2007 | Ejiri et al. | |
| 7,336,299 B2 | 2/2008 | Kostrzewski et al. | |
| 7,612,953 B2 | 11/2009 | Nagai et al. | |
| 7,710,463 B2 | 5/2010 | Foote | |
| 7,805,071 B2 | 9/2010 | Mitani | |
| 7,817,354 B2 | 10/2010 | Wilson | |
| 7,860,214 B1 | 12/2010 | Haff | |
| 7,893,957 B2 | 2/2011 | Peters et al. | |
| 7,961,398 B2 | 6/2011 | Tocci | |
| 7,978,222 B2 | 7/2011 | Schneider | |
| 8,004,557 B2 | 8/2011 | Pan | |
| 8,098,276 B2 | 1/2012 | Chang et al. | |
| 8,115,813 B2 | 2/2012 | Tang | |
| 8,139,125 B2 | 3/2012 | Scherling | |
| 8,228,417 B1 | 7/2012 | Georgiev et al. | |
| 8,267,601 B2 | 9/2012 | Campbell et al. | |
| 8,284,263 B2 | 10/2012 | Oohara et al. | |
| 8,294,073 B1 | 10/2012 | Vance et al. | |
| 8,356,035 B1 | 1/2013 | Baluja et al. | |
| 8,400,555 B1 | 3/2013 | Georgiev et al. | |
| 8,442,392 B2 | 5/2013 | Ollila et al. | |
| 8,482,813 B2 | 7/2013 | Kawano et al. | |
| 8,791,984 B2 | 7/2014 | Jones et al. | |
| 8,836,693 B2 * | 9/2014 | Katano | G06T 15/20 345/419 |
| 8,928,988 B1 * | 1/2015 | Ford | F24J 2/08 359/664 |
| 8,988,564 B2 | 3/2015 | Webster et al. | |
| 9,049,375 B2 | 6/2015 | Wade et al. | |
| 9,055,208 B2 | 6/2015 | Kim | |
| 9,185,296 B2 | 11/2015 | Wade et al. | |
| 9,264,610 B2 * | 2/2016 | Duparre | H01L 27/14621 |
| 9,294,672 B2 * | 3/2016 | Georgiev | G03B 17/17 |
| 9,316,810 B2 | 4/2016 | Mercado | |
| 9,332,188 B2 | 5/2016 | Takei et al. | |
| 9,374,516 B2 | 6/2016 | Osborne | |
| 9,386,222 B2 * | 7/2016 | Georgiev | G03B 17/17 |
| 9,602,806 B1 | 3/2017 | Stafford et al. | |
| 9,609,210 B2 * | 3/2017 | Djordjevic | H04N 5/23238 |
| 9,733,458 B2 * | 8/2017 | Georgiev | G03B 17/17 |
| 9,952,371 B2 * | 4/2018 | Ambur | G02B 5/3083 |
| 9,973,680 B2 | 5/2018 | Osborne et al. | |
| 2001/0028482 A1 | 10/2001 | Nishioka | |
| 2002/0070365 A1 | 6/2002 | Karellas | |
| 2002/0136150 A1 | 9/2002 | Mihara et al. | |
| 2003/0024987 A1 | 2/2003 | Zhu | |
| 2003/0034395 A1 * | 2/2003 | Tsikos | G02B 26/10 235/454 |
| 2003/0038814 A1 | 2/2003 | Blume | |
| 2003/0156751 A1 | 8/2003 | Lee et al. | |
| 2003/0214575 A1 | 11/2003 | Yoshikawa | |
| 2004/0021767 A1 | 2/2004 | Endo et al. | |
| 2004/0051805 A1 | 3/2004 | Yoshikawa et al. | |
| 2004/0066449 A1 | 4/2004 | Givon | |
| 2004/0105025 A1 | 6/2004 | Scherling | |
| 2004/0183907 A1 | 9/2004 | Hovanky et al. | |
| 2004/0195492 A1 | 10/2004 | Hsin | |
| 2004/0246333 A1 | 12/2004 | Steuart et al. | |
| 2004/0263611 A1 | 12/2004 | Cutler | |
| 2005/0053274 A1 | 3/2005 | Mayer et al. | |
| 2005/0057659 A1 | 3/2005 | Hasegawa | |
| 2005/0081629 A1 | 4/2005 | Hoshal | |

(56) References Cited

U.S. PATENT DOCUMENTS

| | | |
|---|---|---|
| 2005/0111106 A1 | 5/2005 | Matsumoto et al. |
| 2005/0185711 A1 | 8/2005 | Pfister et al. |
| 2005/0218297 A1 | 10/2005 | Suda et al. |
| 2005/0243175 A1 | 11/2005 | Yamada et al. |
| 2005/0253951 A1 | 11/2005 | Fujimoto et al. |
| 2006/0023074 A1 | 2/2006 | Cutler |
| 2006/0023106 A1 | 2/2006 | Yee et al. |
| 2006/0023278 A1 | 2/2006 | Nishioka |
| 2006/0061660 A1 | 3/2006 | Brackmann |
| 2006/0084852 A1* | 4/2006 | Mason ............... A61B 5/14552 600/344 |
| 2006/0098267 A1 | 5/2006 | Togawa |
| 2006/0140446 A1 | 6/2006 | Luo et al. |
| 2006/0193509 A1 | 8/2006 | Criminisi et al. |
| 2006/0215054 A1 | 9/2006 | Liang et al. |
| 2006/0215903 A1 | 9/2006 | Nishiyama |
| 2006/0238441 A1 | 10/2006 | Benjamin et al. |
| 2007/0024739 A1 | 2/2007 | Konno |
| 2007/0058961 A1 | 3/2007 | Kobayashi et al. |
| 2007/0064142 A1 | 3/2007 | Misawa et al. |
| 2007/0085903 A1 | 4/2007 | Zhang |
| 2007/0146530 A1 | 6/2007 | Nose |
| 2007/0164202 A1 | 7/2007 | Wurz et al. |
| 2007/0216796 A1 | 9/2007 | Lenel et al. |
| 2007/0242152 A1 | 10/2007 | Chen |
| 2007/0263115 A1 | 11/2007 | Horidan et al. |
| 2007/0268983 A1 | 11/2007 | Elam |
| 2008/0029708 A1 | 2/2008 | Olsen et al. |
| 2008/0030573 A1 | 2/2008 | Ritchey |
| 2008/0030597 A1* | 2/2008 | Olsen ............... H01L 31/02325 348/227.1 |
| 2008/0058629 A1 | 3/2008 | Seibel et al. |
| 2008/0088702 A1 | 4/2008 | Linsenmaier et al. |
| 2008/0117289 A1 | 5/2008 | Schowengerdt et al. |
| 2008/0117532 A1* | 5/2008 | Shafer ............... G03F 7/70225 359/727 |
| 2008/0218612 A1 | 9/2008 | Border et al. |
| 2008/0259172 A1 | 10/2008 | Tamaru |
| 2008/0266404 A1 | 10/2008 | Sato |
| 2008/0290435 A1 | 11/2008 | Oliver et al. |
| 2008/0291543 A1 | 11/2008 | Nomura et al. |
| 2008/0297612 A1 | 12/2008 | Yoshikawa |
| 2008/0316301 A1 | 12/2008 | Givon |
| 2009/0003646 A1 | 1/2009 | Au et al. |
| 2009/0005112 A1 | 1/2009 | Sorek et al. |
| 2009/0015812 A1 | 1/2009 | Schultz et al. |
| 2009/0051804 A1 | 2/2009 | Nomura et al. |
| 2009/0080695 A1* | 3/2009 | Yang ............... G06K 9/748 382/103 |
| 2009/0085846 A1 | 4/2009 | Cho et al. |
| 2009/0096994 A1 | 4/2009 | Smits |
| 2009/0153726 A1 | 6/2009 | Lim |
| 2009/0160931 A1 | 6/2009 | Pockett et al. |
| 2009/0219402 A1 | 9/2009 | Schneider |
| 2009/0268210 A1* | 10/2009 | Prince ............... G01D 5/347 356/494 |
| 2009/0268983 A1* | 10/2009 | Stone ............... H04N 3/1593 382/284 |
| 2009/0268985 A1 | 10/2009 | Wong et al. |
| 2009/0296984 A1 | 12/2009 | Nijim et al. |
| 2009/0315808 A1 | 12/2009 | Ishii |
| 2010/0044555 A1 | 2/2010 | Ohara et al. |
| 2010/0045774 A1 | 2/2010 | Len et al. |
| 2010/0066812 A1 | 3/2010 | Kajihara et al. |
| 2010/0165155 A1 | 7/2010 | Chang |
| 2010/0202766 A1 | 8/2010 | Takizawa et al. |
| 2010/0215249 A1 | 8/2010 | Heitz et al. |
| 2010/0232681 A1 | 9/2010 | Fujieda et al. |
| 2010/0259655 A1 | 10/2010 | Takayama |
| 2010/0265313 A1 | 10/2010 | Liu et al. |
| 2010/0265363 A1 | 10/2010 | Kim |
| 2010/0278423 A1 | 11/2010 | Itoh et al. |
| 2010/0289878 A1 | 11/2010 | Sato et al. |
| 2010/0290703 A1 | 11/2010 | Sim et al. |
| 2010/0290769 A1 | 11/2010 | Nasiri et al. |
| 2010/0302396 A1 | 12/2010 | Golub et al. |
| 2010/0309286 A1 | 12/2010 | Chen et al. |
| 2010/0309333 A1 | 12/2010 | Smith et al. |
| 2011/0001789 A1 | 1/2011 | Wilson et al. |
| 2011/0007135 A1 | 1/2011 | Okada et al. |
| 2011/0009163 A1 | 1/2011 | Fletcher et al. |
| 2011/0012998 A1 | 1/2011 | Pan |
| 2011/0038535 A1 | 2/2011 | Wang et al. |
| 2011/0043623 A1 | 2/2011 | Fukuta et al. |
| 2011/0090575 A1 | 4/2011 | Mori |
| 2011/0096089 A1 | 4/2011 | Shenhav et al. |
| 2011/0096988 A1 | 4/2011 | Suen et al. |
| 2011/0128412 A1 | 6/2011 | Milnes et al. |
| 2011/0150442 A1 | 6/2011 | Ollila et al. |
| 2011/0181588 A1 | 7/2011 | Barenbrug et al. |
| 2011/0213664 A1 | 9/2011 | Osterhout et al. |
| 2011/0235899 A1 | 9/2011 | Tanaka |
| 2011/0249341 A1 | 10/2011 | Difrancesco et al. |
| 2011/0262122 A1 | 10/2011 | Minamisawa et al. |
| 2011/0304764 A1 | 12/2011 | Shigemitsu et al. |
| 2012/0008148 A1 | 1/2012 | Pryce et al. |
| 2012/0033051 A1 | 2/2012 | Atanassov et al. |
| 2012/0044368 A1 | 2/2012 | Lin et al. |
| 2012/0056987 A1 | 3/2012 | Fedoroff |
| 2012/0075168 A1 | 3/2012 | Osterhout et al. |
| 2012/0127276 A1 | 5/2012 | Tsai et al. |
| 2012/0229688 A1 | 9/2012 | Tajiri |
| 2012/0249750 A1 | 10/2012 | Izzat et al. |
| 2012/0249815 A1 | 10/2012 | Bohn et al. |
| 2012/0269400 A1 | 10/2012 | Heyward |
| 2012/0281072 A1 | 11/2012 | Georgiev et al. |
| 2012/0293607 A1 | 11/2012 | Bhogal et al. |
| 2012/0293632 A1 | 11/2012 | Yukich |
| 2012/0327195 A1 | 12/2012 | Cheng |
| 2013/0003140 A1 | 1/2013 | Keniston et al. |
| 2013/0010084 A1 | 1/2013 | Hatano |
| 2013/0038689 A1 | 2/2013 | McDowall |
| 2013/0057655 A1 | 3/2013 | Su et al. |
| 2013/0070055 A1 | 3/2013 | Atanassov et al. |
| 2013/0076924 A1 | 3/2013 | Wade et al. |
| 2013/0077945 A1 | 3/2013 | Liu et al. |
| 2013/0100304 A1 | 4/2013 | Wade et al. |
| 2013/0128030 A1 | 5/2013 | Georgiev |
| 2013/0141802 A1 | 6/2013 | Yang |
| 2013/0182325 A1 | 7/2013 | Minamisawa et al. |
| 2013/0222556 A1 | 8/2013 | Shimada |
| 2013/0229529 A1 | 9/2013 | Lablans |
| 2013/0250045 A1 | 9/2013 | Ki et al. |
| 2013/0250053 A1 | 9/2013 | Levy |
| 2013/0250123 A1 | 9/2013 | Zhang et al. |
| 2013/0260823 A1 | 10/2013 | Shukla et al. |
| 2013/0278785 A1 | 10/2013 | Nomura et al. |
| 2013/0286451 A1 | 10/2013 | Verhaegh |
| 2013/0329015 A1 | 12/2013 | Pulli et al. |
| 2013/0335598 A1 | 12/2013 | Gustavsson et al. |
| 2013/0335600 A1 | 12/2013 | Gustavsson et al. |
| 2014/0009631 A1 | 1/2014 | Topliss |
| 2014/0016832 A1 | 1/2014 | Kong et al. |
| 2014/0085502 A1 | 3/2014 | Lin et al. |
| 2014/0104378 A1 | 4/2014 | Kauff et al. |
| 2014/0111650 A1* | 4/2014 | Georgiev ............... G06T 3/4038 348/159 |
| 2014/0139623 A1 | 5/2014 | Mccain et al. |
| 2014/0139693 A1 | 5/2014 | Takei et al. |
| 2014/0152852 A1 | 6/2014 | Ito et al. |
| 2014/0184749 A1 | 7/2014 | Hilliges et al. |
| 2014/0192253 A1 | 7/2014 | Laroia |
| 2014/0285673 A1 | 9/2014 | Hundley et al. |
| 2014/0340568 A1 | 11/2014 | Sano et al. |
| 2015/0043076 A1 | 2/2015 | Nakayama |
| 2015/0049172 A1 | 2/2015 | Ramachandra et al. |
| 2015/0070562 A1 | 3/2015 | Nayar et al. |
| 2015/0085363 A1 | 3/2015 | Liu et al. |
| 2015/0103197 A1* | 4/2015 | Djordjevic ............ G06T 15/205 348/218.1 |
| 2015/0125092 A1 | 5/2015 | Zhuo et al. |
| 2015/0177524 A1 | 6/2015 | Webster et al. |
| 2015/0201128 A1 | 7/2015 | Dong |

(56) References Cited

U.S. PATENT DOCUMENTS

| | | | |
|---|---|---|---|
| 2015/0244934 A1 | 8/2015 | Duparre et al. | |
| 2015/0253647 A1 | 9/2015 | Mercado | |
| 2015/0286033 A1* | 10/2015 | Osborne | G02B 13/0015 348/345 |
| 2015/0288865 A1* | 10/2015 | Osborne | H04N 5/2624 348/218.1 |
| 2015/0370040 A1* | 12/2015 | Georgiev | G02B 13/007 348/218.1 |
| 2015/0371387 A1 | 12/2015 | Atanassov | |
| 2015/0373252 A1 | 12/2015 | Georgiev | |
| 2015/0373262 A1* | 12/2015 | Georgiev | G03B 17/17 348/218.1 |
| 2015/0373268 A1 | 12/2015 | Osborne | |
| 2015/0373269 A1 | 12/2015 | Osborne | |
| 2015/0373279 A1* | 12/2015 | Osborne | G02B 13/0075 348/36 |
| 2016/0014332 A1* | 1/2016 | de Leon | G06K 9/00248 348/78 |
| 2016/0085059 A1 | 3/2016 | Mercado | |
| 2016/0127641 A1 | 5/2016 | Gove | |
| 2016/0127646 A1 | 5/2016 | Osborne | |
| 2016/0269602 A1 | 9/2016 | Osborne | |
| 2016/0286121 A1* | 9/2016 | Georgiev | G03B 17/17 |
| 2016/0295112 A1 | 10/2016 | Georgiev et al. | |
| 2016/0353008 A1 | 12/2016 | Osborne | |
| 2016/0373263 A1* | 12/2016 | Zaidi | H04L 9/3268 |
| 2017/0026570 A1* | 1/2017 | Shepard | G03B 37/00 |
| 2017/0038502 A1* | 2/2017 | Georgiev | G02B 3/0056 |
| 2017/0118421 A1* | 4/2017 | Georgiev | H04N 5/3415 |
| 2018/0084193 A1 | 3/2018 | Georgiev et al. | |

FOREIGN PATENT DOCUMENTS

| | | |
|---|---|---|
| CN | 101257576 A | 9/2008 |
| CN | 101571666 A | 11/2009 |
| CN | 101581828 A | 11/2009 |
| CN | 101867720 A | 10/2010 |
| CN | 101902657 A | 12/2010 |
| CN | 101952762 A | 1/2011 |
| CN | 202405984 U | 8/2012 |
| EP | 0610605 A1 | 8/1994 |
| EP | 0751416 A1 * | 1/1997 |
| EP | 0751416 A1 * | 1/1997 |
| EP | 1176812 A1 | 1/2002 |
| EP | 1383342 A2 | 1/2004 |
| EP | 1816514 A1 | 8/2007 |
| EP | 1832912 A2 | 9/2007 |
| EP | 2242252 A2 | 10/2010 |
| GB | 2354390 A | 3/2001 |
| GB | 2354391 A | 3/2001 |
| JP | S60213178 A | 10/1985 |
| JP | H06217184 A | 8/1994 |
| JP | H06251127 A | 9/1994 |
| JP | H089424 A | 1/1996 |
| JP | H0847001 A | 2/1996 |
| JP | H08125835 A | 5/1996 |
| JP | 8194274 A | 7/1996 |
| JP | H08242453 A | 9/1996 |
| JP | H09214992 A | 8/1997 |
| JP | H10142490 A | 5/1998 |
| JP | 2001194114 A | 7/2001 |
| JP | 2002158913 A | 5/2002 |
| JP | 2003304561 A | 10/2003 |
| JP | 2004260787 A | 9/2004 |
| JP | 3791847 B1 | 6/2006 |
| JP | 2006279538 A | 10/2006 |
| JP | 2007147457 A | 6/2007 |
| JP | 2007323615 A | 12/2007 |
| JP | 2008009424 A | 1/2008 |
| JP | 2009122842 A | 6/2009 |
| JP | 2010041381 A | 2/2010 |
| JP | 2010067014 A | 3/2010 |
| JP | 2010128820 A | 6/2010 |
| JP | 2010524279 A | 7/2010 |
| KR | 20060049992 A | 5/2006 |
| KR | 20080071400 A | 8/2008 |
| WO | WO-9321560 A1 | 10/1993 |
| WO | WO-9847291 A2 | 10/1998 |
| WO | WO-2006075528 A1 | 7/2006 |
| WO | WO-2007129147 A1 | 11/2007 |
| WO | WO-2008112054 A1 | 9/2008 |
| WO | WO-2009047681 A1 | 4/2009 |
| WO | WO-2009086330 A2 | 7/2009 |
| WO | WO-2010019757 A1 | 2/2010 |
| WO | WO-2012136388 A1 | 10/2012 |
| WO | WO-2012164339 A1 | 12/2012 |
| WO | WO-2013154433 A1 | 10/2013 |
| WO | WO-2014012603 A1 | 1/2014 |
| WO | WO-2014025588 A1 | 2/2014 |

OTHER PUBLICATIONS

Hua et al, Design analysis of a high-resolution panoramic camera using conventional imagers and a mirror pyramid, Feb. 2007.*

Meng et al, Single-shot specular surface reconstruction with gonioplenoptic imaging, 2015.*

Hung et al, Integrated the back-side inclined exposure technology to fabricate the 45 degree k-type prism with nanometer roughness (Year: 2012).*

Han Y., et al., "Removing Illumination from Image Pair for Stereo Matching", Audio, Language and Image Processing (ICALIP), 2012 International Conference on, IEEE, Jul. 16, 2012, XP032278010, pp. 508-512.

Hao M., et al., "Object Location Technique for Binocular Stereo Vision Based on Scale Invariant Feature Transform Feature Points", SIFT, Journal of Harbin Engineering University, Jun. 2009, vol. 30, No. 6 pp. 649-653.

International Search Report and Written Opinion—PCT/US2015/033195—ISA/EPO—dated Dec. 17, 2015.

Kawanishi T., et al., "Generation of High-Resolution Stereo Panoramic Images by Omnidirectional Imaging Sensor Using Hexagonal Pyramidal Mirrors", Pattern Recognition, 1998, Proceedings, Fourteenth International Conference on Brisbane, QLD., Australia Aug. 16-20, 1998, Los Alamitos, CA, USA,IEEE Comput. Soc, US, Jan. 1, 1998 (Jan. 1, 1998), pp. 485-489, vol. 1, XP031098377, ISBN: 978-0-8186-8512-5.

RICOH Imagine Change: "New RICOH THETA Model, Capturing 360-degree Images in One Shot, is on Sale Soon—Spherical Video Function, API and SDK (Beta Version)", News Release, Oct. 28, 2014, 3 pages.

Shuchun Y., et al., "Preprocessing for stereo vision based on LOG filter", Proceedings of 2011 6th International Forum on Strategic Technology, Aug. 2011, XP055211077, pp. 1074-1077.

Tan K-H., et al., "Multiview Panoramic Cameras Using a Pyramid", Omnidirectional Vision, 2002, Proceedings, Third Workshop on Jun. 2, 2002, Piscataway, NJ, USA,IEEE, Jan. 1, 2002 (Jan. 1, 2002), pp. 87-93, XP010611080, ISBN: 978-0-7695-1629-5.

Arican, et al., "Intermediate View Generation for Perceived Depth Adjustment of Sterio Video", Mitsubishi Electric Research Laboratories, http://www.merl.com, TR2009-052, Sep. 2009; 12 pages.

Hoff, et al., "Surfaces from Stereo: Integrating Feature Matching, Disparity Estimation, and Contour Detection", IEEE Transactions on Pattern Analysis and Machine Intelligence, vol. 11, No. 2, pp. 121-136, Feb. 1989.

Krotkov E., et al., "Active vision for reliable ranging: Cooperating focus, stereo, and vergence", International Journal of Computer Vision. vol. 11, No. 2, Oct. 1, 1993 (Oct. 1, 1993), pp. 187-203, XP055149875, ISSN: 0920-5691. DOI: 10.1007/BF01469228.

Murphy M., et al., "Lens Drivers Focus on Performance in High-Resolution Camera Modules," Analog Dialogue, Nov. 2006, vol. 40, pp. 1-3.

Narkhede, et al., "Stereoscopic Imaging: A Real-Time, In Depth Look," IEEE Potentials, Feb./Mar. 2004, vol. 23, Issue 1, pp. 38-42.

Sun W.S., et al., "Single-Lens Camera Based on a Pyramid Prism Array to Capture Four Images," Optical Review, 2013, vol. 20 (2), pp. 145-152.

(56) References Cited

OTHER PUBLICATIONS

Zhao W., et al., "Effects of Camera Alignment Errors on Stereoscopic Depth Estimates," Dec. 1996, Pattern Recognition, 24 pages.

* cited by examiner

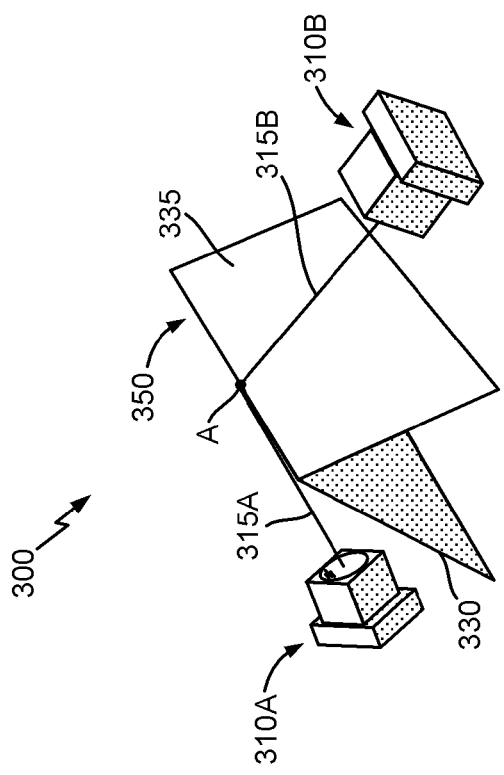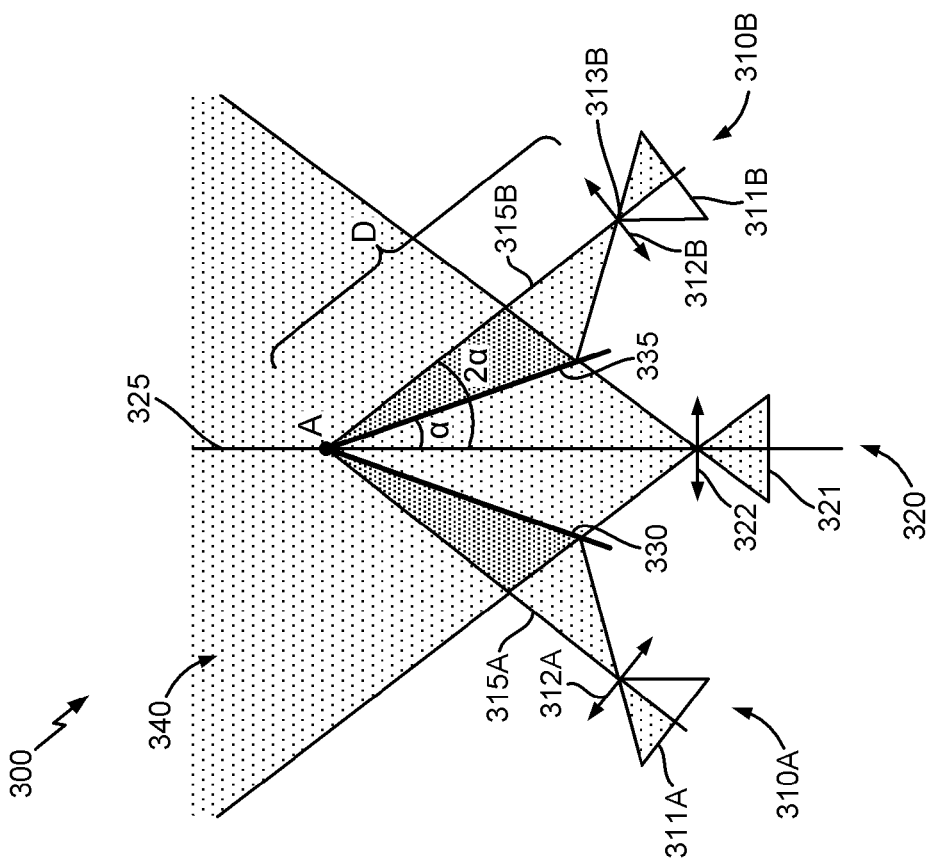

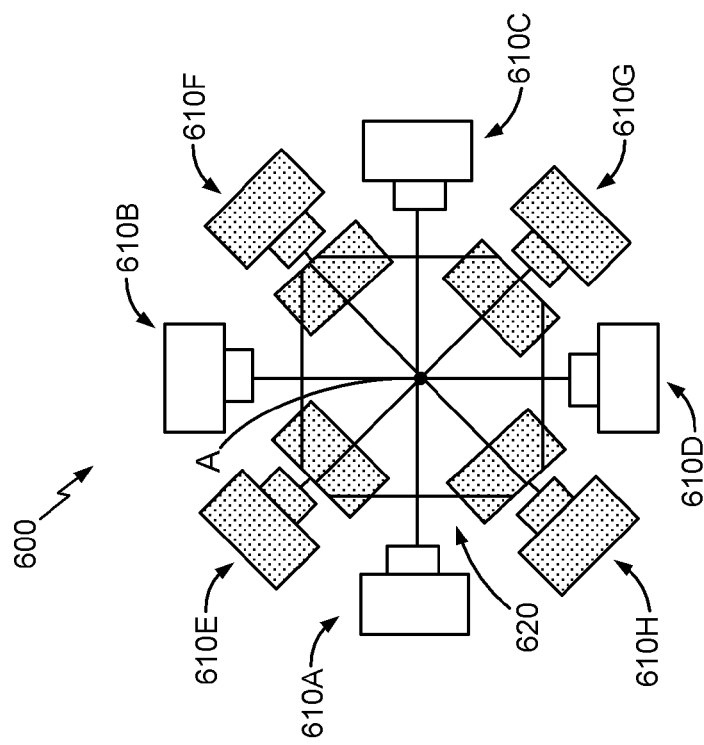
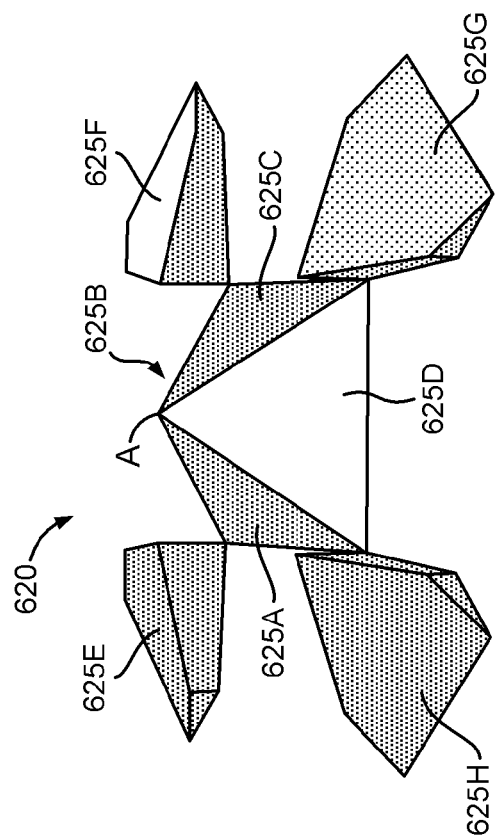
FIG. 6B
FIG. 6A

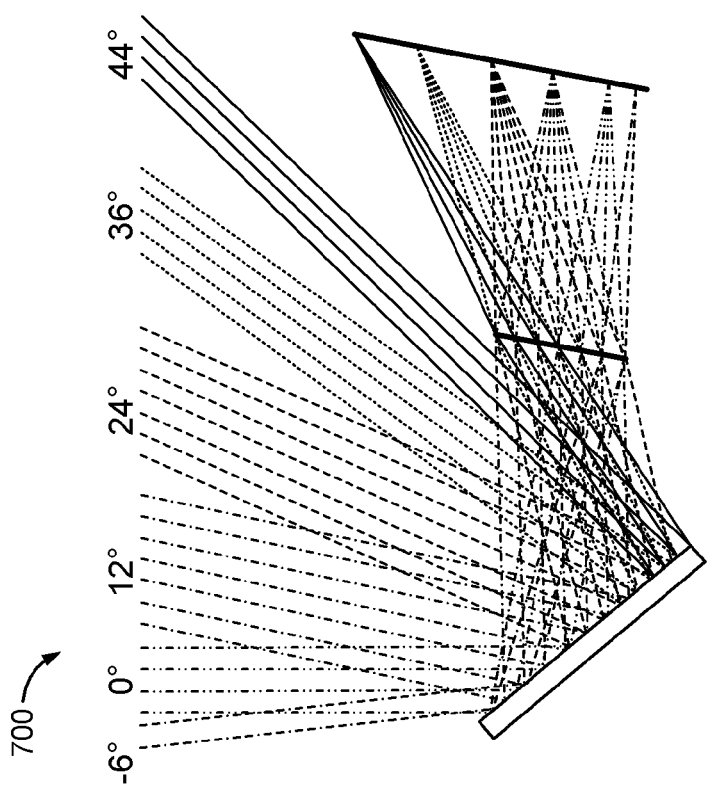
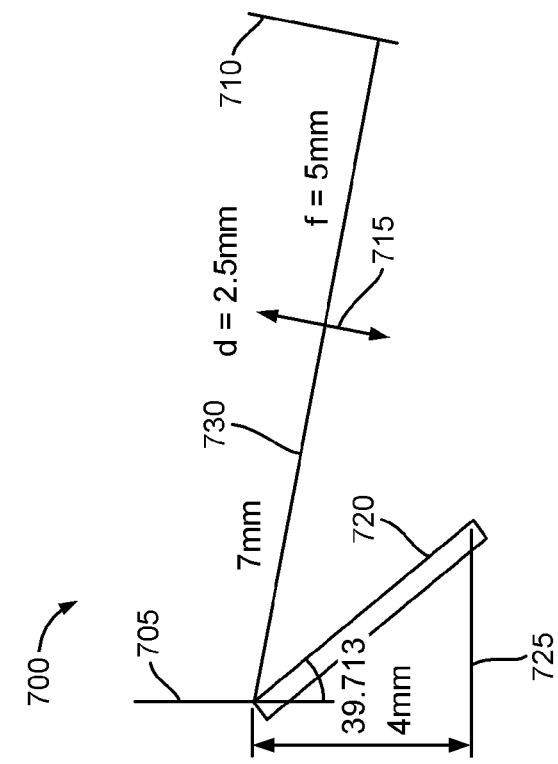
FIG. 7A
FIG. 7B 100,084,958 B2

MULTI-CAMERA SYSTEM USING FOLDED OPTICS FREE FROM PARALLAX AND TILT ARTIFACTS

CROSS REFERENCE TO RELATED APPLICATIONS

The present application is a continuation of U.S. patent application Ser. No. 14/571,149, filed on Dec. 15, 2014, entitled "MULTI-CAMERA SYSTEM USING FOLDED OPTICS FREE FROM PARALLAX AND TILT ARTIFACTS," which claims the benefit under 35 U.S.C. §119(e) of U.S. Provisional Patent Application No. 62/015,319, filed on Jun. 20, 2014, entitled "MULTI-CAMERA SYSTEM USING FOLDED OPTICS FREE FROM PARALLAX AND TILT ARTIFACTS," the contents of which is hereby incorporated by reference herein.

TECHNICAL FIELD

The present disclosure relates to imaging systems and methods that include a multi-camera array. In particular, the disclosure relates to systems and methods that enable low-profile imaging systems and mobile devices while maintaining or improving image quality.

BACKGROUND

Many mobile devices, such as mobile phones and tablet computing devices, include cameras that may be operated by a user to capture still and/or video images. Because the mobile devices are typically designed to be relatively small, it can be important to design the cameras or imaging systems to be as thin as possible in order to maintain a low-profile mobile device. Folded optic image sensor arrays ("array cameras") allow for the creation of low-profile image capture devices without shortening the focal length or decreasing the resolution of the image across the sensor array's field of view. By redirecting light toward each sensor in the array using a primary and secondary surface, and by positioning the lens assemblies used to focus the incoming light between the primary and secondary surfaces, the sensor array may be positioned on a flat substrate perpendicular to the lens assemblies. The longer focal length makes it possible to implement features such as optical zoom and to incorporate more complicated optics that require more space than commonly afforded by the traditional mobile camera, such as adding more optical elements.

Some array cameras employ a central mirror or prism with multiple facets to split incoming light comprising the target image into multiple portions for capture by the sensors in the array, wherein each facet directs a portion of the light from the target image toward a sensor in the array. Each portion of the split light may be passed through a lens assembly and reflected off of a surface positioned directly above or below a sensor, such that each sensor captures a portion of the image. The sensor fields of view can overlap to assist in stitching together the captured portions into a complete image.

SUMMARY

The folded optic sensor arrays and image capture techniques described herein allow for the creation of low-profile image capture devices without shortening the focal length or decreasing the resolution of the image across the sensor array's field of view, wherein the captured images may be free of parallax and tilt artifacts. A challenge of existing array cameras is the quality degradation due to parallax and/or tilt between different views of same object as seen from different cameras of the array. Parallax prevents seamless stitching of the images captured by each camera into a final image completely free of artifacts. Camera views can partially overlap (for example, by approximately 20%). Depending on depth (for example, distance from lens to object) the image from one camera can be shifted relative to the image from another camera. The resulting parallax and tilt can cause "double image" ghosting in the image area corresponding to the overlapping fields of view when the images are stitched or fused together. Even if the array is structured such that there is no overlap in sensor fields of view, parallax results in discontinuous features in the image, such as lines and edges, when such features cross over the borders between sensor fields of view.

The above-described problems, among others, are addressed in some embodiments by the array cameras free (or substantially free) of parallax and tilt artifacts as described herein. Some of the embodiments may employ a central mirror or prism, for example with multiple surfaces or facets, to split incoming light comprising the target image into multiple portions for capture by the sensors in the array. The mirror surfaces and surrounding cameras can be configured to avoid causing parallax and tilt artifacts in a captured image. For example, the planes formed by the mirror surfaces or prism facets may all intersect at a common point, referred to as the apex, which may be along the vertical axis of symmetry of the array in some embodiments. The cameras can be positioned so that the optical axis of each camera is aligned with or intersects with the apex. The optical axis of a camera can intersect with both a center of projection of its lens assembly and the apex. Accordingly, the synthetic aperture (the sum of all views of the cameras in the array) can have a virtual optical axis passing through the apex. In addition, each camera can be positioned such that the angle formed between the camera optical axis and the virtual optical axis is twice the angle formed between the corresponding mirror surface and the virtual optical axis. However, these angles do not have to be the same for all cameras in the array. Accordingly, in some embodiments the apex may not be along the vertical axis of symmetry of the array. Further, the distance between the apex and the center of projection (located within the lens corresponding to a sensor) can be the same for all the cameras in the array. Accordingly, the views of the cameras in the array can seamlessly merge into a single image free of parallax and tilt artifacts.

Each portion of the split light may be passed through a lens assembly and reflected off of an optional additional reflective surface positioned directly above or below a sensor, such that each sensor captures a portion of the image. In some circumstances, each sensor in the array may capture a portion of the image which overlaps slightly with the portions captured by neighboring sensors in the array, and these portions may be assembled into the target image, for example by linear blending or other image stitching techniques. The sensors can be positioned off-center from the optical axis of its lens assembly in some examples in order to capture a wider field of view.

One aspect relates to an imaging system comprising a reflecting component including a plurality of primary light redirecting surfaces, the reflecting component comprising an apex at a location of an intersection of planes formed by each of the plurality of primary light redirecting surfaces; and a plurality of cameras, each of the plurality of cameras having an optical axis, the plurality of cameras arranged to each receive light redirected from one of the primary light redirecting surfaces of the reflecting component and such that the optical axis of each of the plurality of cameras is aligned to intersect with the apex of the reflecting component.

Another aspect relates to a method of manufacturing a folded optic array camera substantially free of parallax and tilt artifacts, the method comprising providing a reflecting component including a plurality of primary light redirecting surfaces, the reflecting component comprising an apex at a location of an intersection of planes formed by each of the plurality of primary light redirecting surfaces; and for each camera of a plurality of cameras positioned around the reflecting component positioning a lens assembly to receive a portion of light representing a target image scene from one of the plurality of primary light redirecting surfaces, the lens assembly having an optical axis, and positioning the lens assembly such that the optical axis is aligned to intersect with the apex.

Another aspect relates to an image capture apparatus comprising means for splitting light representing a target image scene into a plurality of portions and redirecting each of the plurality of portions in a different direction; means for focusing each of the plurality of portions of light; and means for capturing each of the plurality of portions of light after being focused; the means for splitting light, means for focusing, and means for capturing positioned according to a predetermined spatial relationship in order to reduce or eliminate parallax and tilt artifacts between images generated based on the plurality of portions of light.

Another aspect relates to a method of forming an array camera substantially free of parallax and tilt artifacts, the method comprising, for each camera of a plurality of cameras positioned in an array having a vertical axis of symmetry selecting a first location for an image sensor; selecting a second location for a primary light directing surface such that a plane formed by the primary light directing surface intersects with an apex point, the second location selected such that the primary light directing surface directs a portion of light representing a target image scene toward the image sensor; and selecting a third location for a center of projection of a lens assembly positioned between the sensor and the primary light directing surface, third location selected such that an optical axis angle of the camera intersects with the apex point; said method performed programmatically by one or more computing devices.

BRIEF DESCRIPTION OF THE DRAWINGS

The disclosed aspects will hereinafter be described in conjunction with the appended drawings and appendices, provided to illustrate and not to limit the disclosed aspects, wherein like designations denote like elements.

FIGS. 3A through 3C illustrate an embodiment of an array camera free of parallax and tilt artifacts.

FIGS. 6A through 6C illustrate an embodiment of an array camera free of parallax and tilt artifacts.

FIGS. 7A and 7B illustrate an example of design parameters for one sensor and mirror of the array camera.

DETAILED DESCRIPTION

I. Introduction

Implementations disclosed herein provide systems, methods and apparatus for generating images substantially free of parallax and tilt artifacts using an array camera with folded optics. Aspects of the present invention relate to an array camera exhibiting little or no parallax artifacts in the captured images. For example, the planes of the central mirror pyramid or prism of the array camera can intersect at a common point (referred to as an "apex"). The apex can serve as a point of intersection for the optical axes of the cameras in the array, as well as a point of intersection with the virtual optical axis. Each camera in the array "sees" a portion of the image scene using a corresponding facet of the central mirror prism, and accordingly each individual camera/mirror pair represents only a sub-aperture of the total array camera. The complete array camera has a synthetic aperture generated based on the sum of all individual aperture rays, that is, based on stitching together the images generated by the sub-apertures. Each camera can include a sensor and a lens assembly, the lens assembly having a center of projection located along the camera optical axis, and may optionally include a secondary light redirecting surface between the sensor and lens assembly. The sensor may be positioned off-center from the optical axis to capture more light from the image scene.

In the following description, specific details are given to provide a thorough understanding of the examples. However, the examples may be practiced without these specific details.

II. Overview of Folded Optic Array Cameras

Figure 1A:
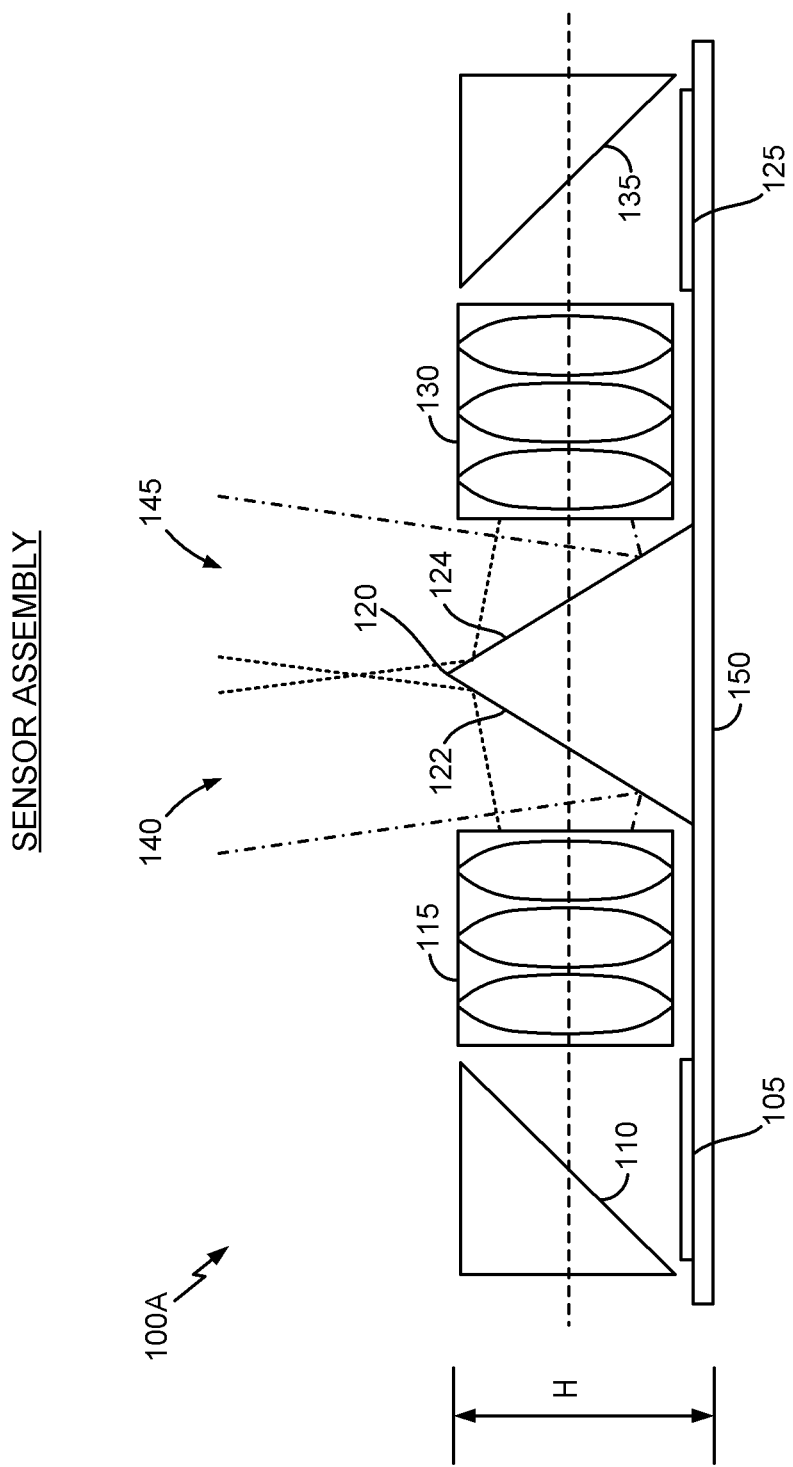
FIG. 1A illustrates a cross-sectional side view of an embodiment of a folded optic array camera.
Figure 1B:
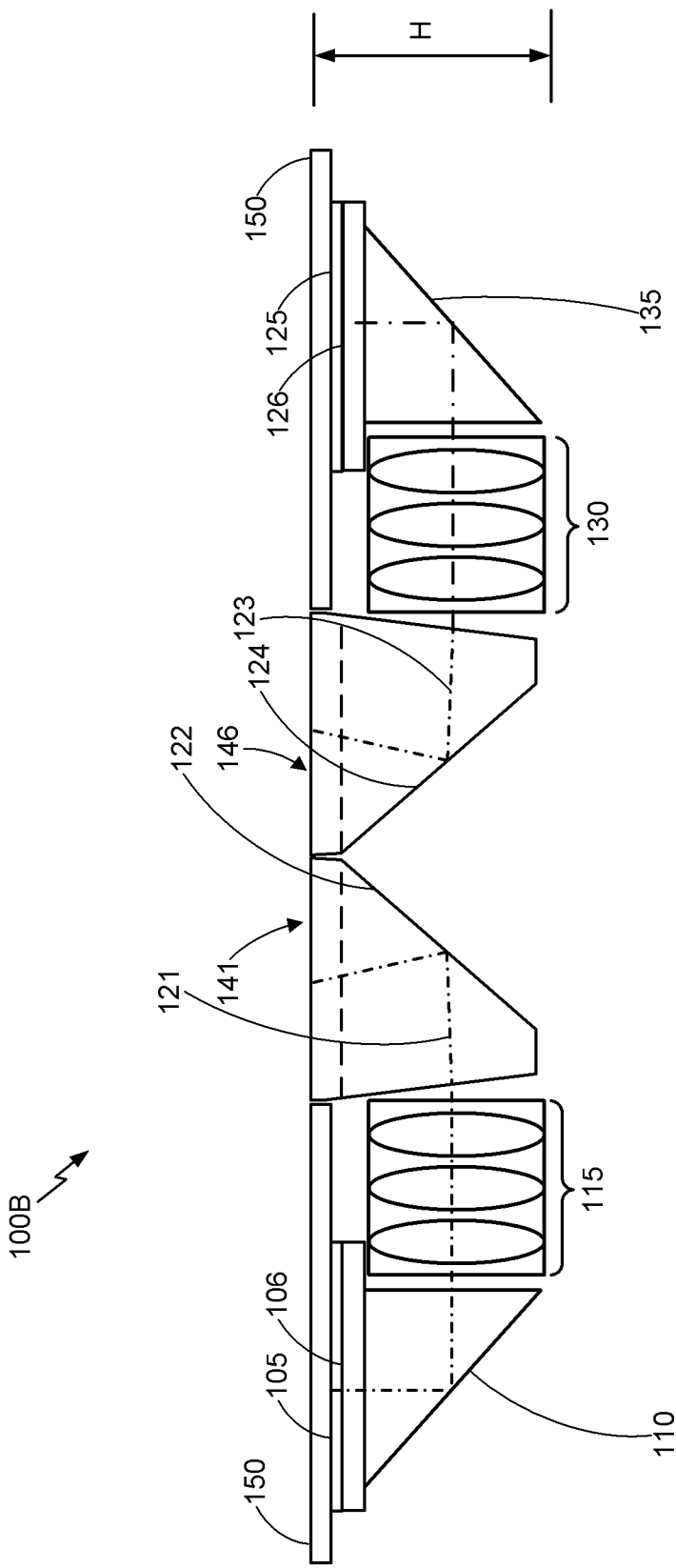
FIG. 1B illustrates a cross-sectional side view of another embodiment of a folded optic array camera.

Referring now to FIGS. 1A and 1B, examples of a folded optic multi-sensor assembly 100A, 100B suitable for use with the autofocus systems and techniques described herein will now be described in greater detail. FIG. 1A illustrates a cross-sectional side view of an example of a folded optics array 100A including image sensors 105, 125, reflective secondary light redirecting surfaces 110, 135, lens assemblies 115, 130, and a central reflective surface 120 which may all be mounted to a substrate 150. FIG. 1B illustrates a cross-sectional side view of an embodiment of a folded optic sensor array including central prisms 141, 146 for primary light redirecting surfaces 122, 124 and additional prisms forming secondary light redirecting surfaces 135, 110.

Referring to FIG. 1A, the image sensors 105, 125 may include, in certain embodiments, a charge-coupled device (CCD), complementary metal oxide semiconductor sensor (CMOS), or any other image sensing device that receives light and generates image data in response to the received image. Image sensors 105, 125 may be able to obtain image data of still photographs and may also provide information regarding motion in a captured video stream. Sensors 105 and 125 may be individual sensors or may represent arrays of sensors, such as a 3×1 array. However, as will be understood by one skilled in the art, any suitable array of sensors may be used in the disclosed implementations.

The sensors 105, 125 may be mounted on the substrate 150 as shown in FIG. 1A. In some embodiments, all sensors may be on one plane by being mounted to the flat substrate 150. Substrate 150 may be any suitable substantially flat material. The central reflective surface 120 and lens assemblies 115, 130 may be mounted on the substrate 150 as well. Multiple configurations are possible for mounting a sensor array or arrays, a plurality of lens assemblies, and a plurality of primary and secondary reflective or refractive surfaces.

Still referring to FIG. 1A, in some embodiments, a central reflective surface 120 may be used to redirect light from a target image scene toward the sensors 105, 125. Central reflective surface 120 may be a mirror or a plurality of mirrors, and may be flat or shaped as needed to properly redirect incoming light to the image sensors 105, 125. For example, in some embodiments, central reflective surface 120 may be a mirror sized and shaped to reflect incoming light rays through the lens assemblies 115, 130 to sensors 105, 125, respectively. The central reflective surface 120 may split light comprising the target image into multiple portions and direct each portion at a different sensor. For example, a first side 122 of the central reflective surface 120 (also referred to as a primary light redirecting surface, as other embodiments may implement a refractive prism rather than a reflective surface) may send a portion of the light corresponding to a first field of view 140 toward the left sensor 105 while a second side 124 sends a second portion of the light corresponding to a second field of view 145 toward the right sensor 125. It should be appreciated that together the fields of view 140, 145 of the image sensors cover at least the target image.

In some embodiments in which the receiving sensors are each an array of a plurality of sensors, the central reflective surface may be made of multiple reflective surfaces angled relative to one another in order to send a different portion of the target image scene toward each of the sensors. Each sensor in the array may have a substantially different field of view, and in some embodiments the fields of view may overlap. Certain embodiments of the central reflective surface may have complicated non-planar surfaces to increase the degrees of freedom when designing the lens system. Further, although the central surface is discussed as being a reflective surface, in other embodiments central surface may be refractive. For example, central surface may be a prism configured with a plurality of facets, where each facet directs a portion of the light comprising the scene toward one of the sensors.

After being reflected off the central reflective surface 120, the light may propagate through lens assemblies 115, 130 as illustrated in FIG. 1A. One or more lens assemblies 115, 130 may be provided between the central reflective surface 120 and the sensors 105, 125 and reflective surfaces 110, 135. The lens assemblies 115, 130 may be used to focus the portion of the target image which is directed toward each sensor.

In some embodiments, each lens assembly may comprise one or more lenses and an actuator for moving the lens among a plurality of different lens positions through a housing. The actuator may be a voice coil motor (VCM), micro-electronic mechanical system (MEMS), or a shape memory alloy (SMA). The lens assembly may further comprise a lens driver for controlling the actuator.

Traditional auto focus techniques may be implemented by changing the focal length between the lens 115, 130 and corresponding sensor 105, 125 of each camera. In some embodiments, this may be accomplished by moving a lens barrel. Other embodiments may adjust the focus by moving the central mirror up or down or by adjusting the angle of the mirror relative to the lens assembly. Certain embodiments may adjust the focus by moving the side mirrors over each sensor. Such embodiments may allow the assembly to adjust the focus of each sensor individually. Further, it is possible for some embodiments to change the focus of the entire assembly at once, for example by placing a lens like a liquid lens over the entire assembly. In certain implementations, computational photography may be used to change the focal point of the camera array.

As illustrated in FIG. 1A, multiple side reflective surfaces, such as reflective surfaces 110 and 135, can be provided around the central mirror 120 opposite the sensors. After passing through the lens assemblies, the side reflective surfaces 110, 135 (also referred to as a secondary light redirecting surface, as other embodiments may implement a refractive prism rather than a reflective surface) can reflect the light ("downward" in orientation as depicted in FIG. 1A) onto the flat sensors 105, 125. As depicted, sensor 105 may be positioned beneath reflective surface 110 and sensor 125 may be positioned beneath reflective surface 135. However, in other embodiments, the sensors may be above the side reflected surfaces, and the side reflective surfaces may be configured to reflect light upward. Other suitable configurations of the side reflective surfaces and the sensors are possible in which the light from each lens assembly is redirected toward the sensors. Certain embodiments may enable movement of the side reflective surfaces 110, 135 to change the focus or field of view of the associated sensor.

Each sensor's field of view 140, 145 may be steered into the object space by the surface of the central mirror 120 associated with that sensor. Mechanical methods may be employed to tilt the mirrors and/or move the prisms in the array so that the field of view of each camera can be steered to different locations on the object field. This may be used, for example, to implement a high dynamic range camera, to increase the resolution of the camera system, or to implement a plenoptic camera system. Each sensor's (or each 3×1 array's) field of view may be projected into the object space, and each sensor may capture a partial image comprising a portion of the target scene according to that sensor's field of view. In some embodiments, the fields of view 140, 145 for the opposing sensor arrays 105, 125 may overlap by a certain amount 150. To reduce the overlap 150 and form a single image, a stitching process as described below may be used to combine the images from the two opposing sensor arrays 105, 125. Certain embodiments of the stitching process may employ the overlap 150 for identifying common features in stitching the partial images together. After stitching the overlapping images together, the stitched image may be cropped to a desired aspect ratio, for example 4:3 or 1:1, to form the final image.

FIG. 1B illustrates a cross-sectional side view of another embodiment of a folded optic array camera 100B. As shown in FIG. 1B, a sensor assembly 100B includes a pair of image sensors 105, 125 each mounted to substrate 150, lens assemblies 115, 130 corresponding to image sensors 105, 125, respectively, and a secondary light redirecting surface 110, 135 positioned over the cover glass 106, 126 of image sensors 105, 125, respectively. The primary light redirecting surface 122 of refractive prism 141 directs a portion of light from the target image scene along optical axis 121 through the lens assembly 115, is redirected off of the secondary light redirecting surface 110, passes through the cover glass 106, and is incident upon the sensor 105. The primary light redirecting surface 124 of refractive prism 146 directs a portion of light from the target image scene along optical axis 123 through the lens assembly 130, is redirected off of the secondary light redirecting surface 135, passes through the cover glass 126, and is incident upon the sensor 125. The folded optic array camera 100B is illustrative of one array camera embodiment implementing refractive prisms instead of the reflective surfaces of the array camera 100A of FIG. 1A. Each of the refractive prisms 141, 146 is provided in an aperture in the substrate 150 such that the primary light directing surfaces 122, 124 are below the plane formed by substrate and receive light representing the target image scene.

The sensors 105, 125 may be mounted on the substrate 150 as shown in FIG. 1B. In some embodiments, all sensors may be on one plane by being mounted to the flat substrate 150. Substrate 150 may be any suitable substantially flat material. The substrate 150 can include an aperture as described above to allow incoming light to pass through the substrate 150 to the primary light redirecting surfaces 122, 124. Multiple configurations are possible for mounting a sensor array or arrays, as well as the other camera components illustrated, to the substrate 150.

Still referring to FIG. 1B, primary light redirecting surfaces 122, 124 may be prism surfaces as illustrated, or may be a mirror or a plurality of mirrors, and may be flat or shaped as needed to properly redirect incoming light to the image sensors 105, 125. In some embodiments the primary light redirecting surfaces 122, 124 may be formed as a central mirror pyramid or prism as illustrated in FIG. 1A. The central mirror pyramid, prism, or other optical component may split light representing the target image into multiple portions and direct each portion at a different sensor. For example, a primary light redirecting surface 122 may send a portion of the light corresponding to a first field of view toward the left sensor 105 while primary light redirecting surface 124 sends a second portion of the light corresponding to a second field of view toward the right sensor 125. In some embodiments in which the receiving sensors are each an array of a plurality of sensors, the light redirecting surfaces may be made of multiple reflective surfaces angled relative to one another in order to send a different portion of the target image scene toward each of the sensors. It should be appreciated that together the fields of view of the cameras cover at least the target image, and can be aligned and stitched together after capture to form a final image captured by the synthetic aperture of the array.

Each sensor in the array may have a substantially different field of view, and in some embodiments the fields of view may overlap. As described in more detail below, the spatial relationships between the various primary light redirecting surfaces 122, 124, lens assemblies 115, 130, and sensors 105, 125 can be predetermined to reduce or eliminate parallax and tilt artifacts occurring between the different fields of view.

As illustrated by FIGS. 1A and 1B, each array camera has a total height H. In some embodiments, the total height H can be approximately 4.5 mm or less. In other embodiments, the total height H can be approximately 4.0 mm or less. Though not illustrated, the entire array camera 100A, 100B may be provided in a housing having a corresponding interior height of approximately 4.5 mm or less or approximately 4.0 mm or less.

Some configurations of such array cameras 100A, 100B can suffer from parallax and tilt artifacts based on the relative positioning of the sensors and light redirecting surfaces, presenting challenges with respect to quality degradation due to parallax and tilt between different views of same object as seen from different cameras of the array. Parallax and tilt prevent seamless stitching of the images captured by each camera into a final image completely free of artifacts. Depending on depth (e.g., distance from lens to object) the image from one camera can be shifted in position and angle relative to an overlapping image from another camera. The resulting parallax and tilt can cause "double image" ghosting in the image area corresponding to the overlapping fields of view when the images are stitched or fused together. Even if the array is structured such that there is no overlap in sensor fields of view, parallax results in discontinuous features in the image, such as lines and edges, when such features cross over the borders between sensor fields of view.

As used herein, the term "camera" refers to an image sensor, lens system, and a number of corresponding light redirecting surfaces, for example the primary light redirecting surface 124, lens assembly 130, secondary light redirecting surface 135, and sensor 125 as illustrated in FIG. 1. A folded-optic multi-sensor array, referred to as an "array" or "array camera," can include a plurality of such cameras in various configurations. Some embodiments of array configurations are disclosed in U.S. Application Pub. No. 2014/0111650, filed Mar. 15, 2013 and titled "MULTI-CAMERA SYSTEM USING FOLDED OPTICS," the disclosure of which is hereby incorporated by reference. Other array camera configurations that would benefit from the geometric relationships for reduction or elimination of parallax artifacts described herein are possible.

Figure 2:
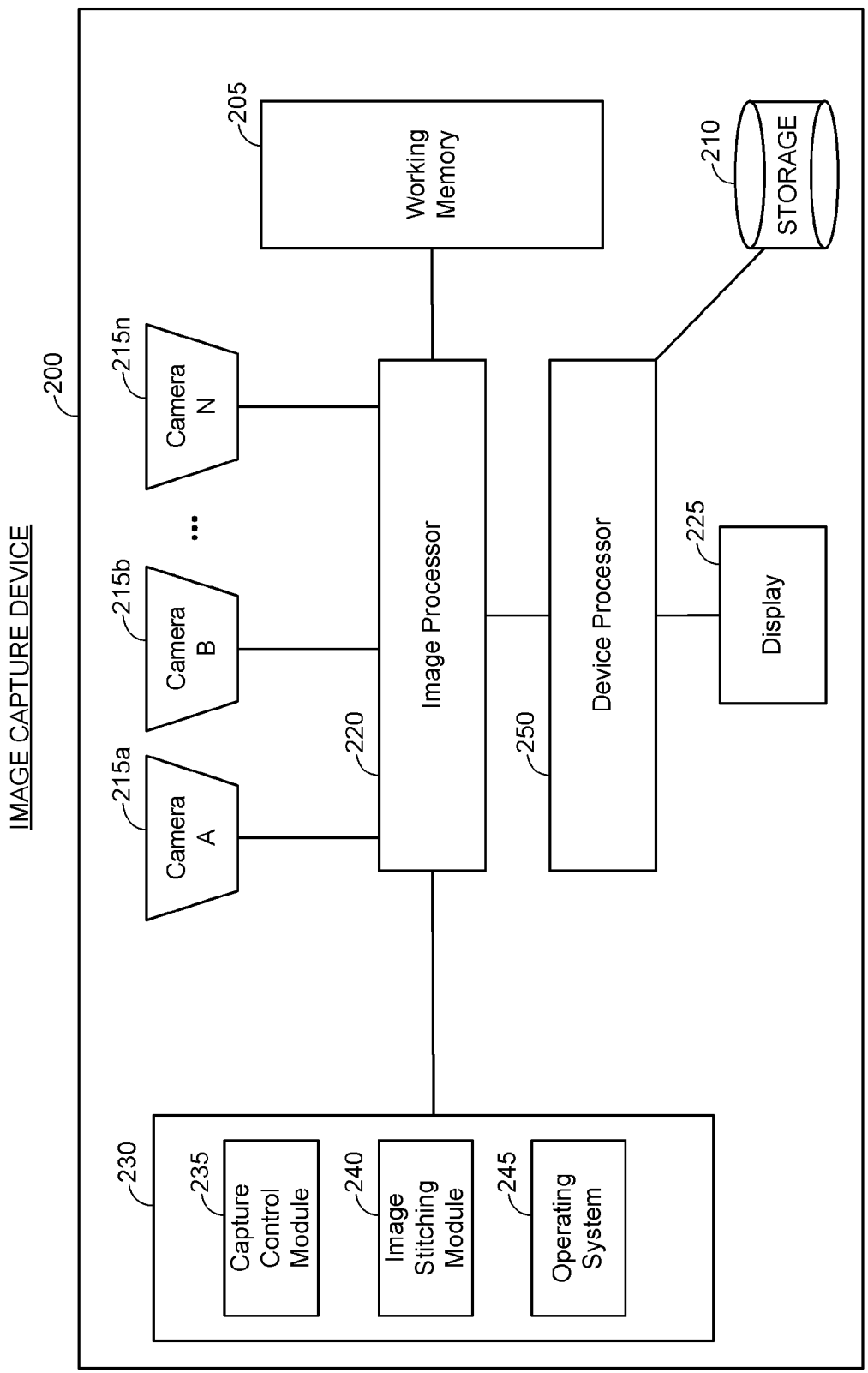
FIG. 2 illustrates a block diagram of one embodiment of an image capture device.

FIG. 2 depicts a high-level block diagram of a device 200 having a set of components including an image processor 220 linked to one or more cameras 215a-n. The image processor 220 is also in communication with a working memory 205, memory 230, and device processor 250, which in turn is in communication with storage 210 and electronic display 225.

Device 200 may be a cell phone, digital camera, tablet computer, personal digital assistant, or the like. There are many portable computing devices in which a reduced thickness imaging system such as is described herein would provide advantages. Device 200 may also be a stationary computing device or any device in which a thin imaging system would be advantageous. A plurality of applications may be available to the user on device 200. These applications may include traditional photographic and video applications, high dynamic range imaging, panoramic photo and video, or stereoscopic imaging such as 3D images or 3D video.

The image capture device 200 includes the cameras 215a-n for capturing external images. The cameras 215a-n may each comprise a sensor, lens assembly, and a primary and secondary reflective or refractive surface for redirecting a portion of a target image to each sensor, as discussed above with respect to FIG. 1. In general, N cameras 215a-n may be used, where N≥2. Thus, the target image may be split into N portions in which each sensor of the N cameras captures one portion of the target image according to that sensor's field of view. It will be understood that cameras 215a-n may comprise any number of cameras suitable for an implementation of the folded optic imaging device described herein. The number of sensors may be increased to achieve lower z-heights of the system, as discussed in more detail below with respect to FIG. 4, or to meet the needs of other purposes, such as having overlapping fields of view similar to that of a plenoptic camera, which may enable the ability to adjust the focus of the image after post-processing. Other embodiments may have a field of view overlap configuration suitable for high dynamic range cameras enabling the ability to capture two simultaneous images and then merge them together. The cameras 215a-n may be coupled to the image processor 220 to transmit captured image to the device processor 250.

The image processor 220 may be configured to perform various processing operations on received image data comprising N portions of the target image in order to output a high quality stitched image, as will be described in more detail below. Image processor 220 may be a general purpose processing unit or a processor specially designed for imaging applications. Examples of image processing operations include cropping, scaling (e.g., to a different resolution), image stitching, image format conversion, color interpolation, color processing, image filtering (e.g., spatial image filtering), lens artifact or defect correction, etc. Image processor 220 may, in some embodiments, comprise a plurality of processors. Certain embodiments may have a processor dedicated to each image sensor. Image processor 220 may be one or more dedicated image signal processors (ISPs) or a software implementation of a processor.

As shown, the image processor 220 is connected to a memory 230 and a working memory 205. In the illustrated embodiment, the memory 230 stores capture control module 235, image stitching module 240, and operating system 245. These modules include instructions that configure the image processor 220 of device processor 250 to perform various image processing and device management tasks. Working memory 205 may be used by image processor 220 to store a working set of processor instructions contained in the modules of memory 230. Alternatively, working memory 205 may also be used by image processor 220 to store dynamic data created during the operation of device 200.

As mentioned above, the image processor 220 is configured by several modules stored in the memories. The capture control module 235 may include instructions that configure the image processor 220 to adjust the focus position of cameras 215a-n. Capture control module 235 may further include instructions that control the overall image capture functions of the device 200. For example, capture control module 235 may include instructions that call subroutines to configure the image processor 220 to capture raw image data of a target image scene using the cameras 215a-n. Capture control module 235 may then call the image stitching module 240 to perform a stitching technique on the N partial images captured by the cameras 215a-n and output a stitched and cropped target image to imaging processor 220. Capture control module 235 may also call the image stitching module 240 to perform a stitching operation on raw image data in order to output a preview image of a scene to be captured, and to update the preview image at certain time intervals or when the scene in the raw image data changes.

Image stitching module 240 may comprise instructions that configure the image processor 220 to perform stitching and cropping techniques on captured image data. For example, each of the N sensors 215a-n may capture a partial image comprising a portion of the target image according to each sensor's field of view. The fields of view may share areas of overlap, as described above and below. In order to output a single target image, image stitching module 240 may configure the image processor 220 to combine the multiple N partial images to produce a high-resolution target image. Target image generation may occur through known image stitching techniques. Examples of image stitching can be found in U.S. patent application Ser. No. 11/623,050 which is hereby incorporated by reference in its entirety.

For instance, image stitching module 240 may include instructions to compare the areas of overlap along the edges of the N partial images for matching features in order to determine rotation and alignment of the N partial images relative to one another. Due to rotation of partial images and/or the shape of the field of view of each sensor, the combined image may form an irregular shape. Therefore, after aligning and combining the N partial images, the image stitching module 240 may call subroutines which configure image processor 220 to crop the combined image to a desired shape and aspect ratio, for example a 4:3 rectangle or 1:1 square. The cropped image may be sent to the device processor 250 for display on the display 225 or for saving in the storage 210.

Operating system module 245 configures the image processor 220 to manage the working memory 205 and the processing resources of device 200. For example, operating system module 245 may include device drivers to manage hardware resources such as the cameras 215a-n. Therefore, in some embodiments, instructions contained in the image processing modules discussed above may not interact with these hardware resources directly, but instead interact through standard subroutines or APIs located in operating system component 270. Instructions within operating system 245 may then interact directly with these hardware components. Operating system module 245 may further configure the image processor 220 to share information with device processor 250.

Device processor 250 may be configured to control the display 225 to display the captured image, or a preview of the captured image, to a user. The display 225 may be external to the imaging device 200 or may be part of the imaging device 200. The display 225 may also be configured to provide a view finder displaying a preview image for a use prior to capturing an image, or may be configured to display a captured image stored in memory or recently captured by the user. The display 225 may comprise an LCD or LED screen, and may implement touch sensitive technologies.

Device processor 250 may write data to storage module 210, for example data representing captured images. While storage module 210 is represented graphically as a traditional disk device, those with skill in the art would understand that the storage module 210 may be configured as any storage media device. For example, the storage module 210 may include a disk drive, such as a floppy disk drive, hard disk drive, optical disk drive or magneto-optical disk drive, or a solid state memory such as a FLASH memory, RAM, ROM, and/or EEPROM. The storage module 210 can also include multiple memory units, and any one of the memory units may be configured to be within the image capture device 200, or may be external to the image capture device 200. For example, the storage module 210 may include a ROM memory containing system program instructions stored within the image capture device 200. The storage module 210 may also include memory cards or high speed memories configured to store captured images which may be removable from the camera.

Although FIG. 2 depicts a device having separate components to include a processor, imaging sensor, and memory, one skilled in the art would recognize that these separate components may be combined in a variety of ways to achieve particular design objectives. For example, in an alternative embodiment, the memory components may be combined with processor components to save cost and improve performance. In some embodiments, a device may include a single processor that can perform the functionality that is described in reference to the device processor 250 and the image processor 220.

Additionally, although FIG. 2 illustrates two memory components, including memory component 230 comprising several modules and a separate memory 205 comprising a working memory, one with skill in the art would recognize several embodiments utilizing different memory architectures. For example, a design may utilize ROM or static RAM memory for the storage of processor instructions implementing the modules contained in memory 230. The processor instructions may be loaded into RAM to facilitate execution by the image processor 220. For example, working memory 205 may comprise RAM memory, with instructions loaded into working memory 205 before execution by the image processor 220.

III. Overview of Folded Optic Array Cameras Free from Parallax and Tilt Artifacts FIGS. 3A and 3B illustrate an embodiment of an array camera free of parallax and tilt artifacts due to arrangement of the various components according to the predetermined spatial relationships defined below. As illustrated by FIGS. 3A and 3B, two mirror surfaces 330, 335 and two corresponding sensors 311A, 311B can be configured based on a predefined spatial relationship to avoid causing parallax and tilt artifacts in a captured image. A sensor of the array and its corresponding lens is referred to as a "camera," and the cooperation of all cameras in the array is referred to as a "virtual camera." Though not illustrated, each camera may have a secondary light redirecting surface as described above in order to redirect light toward a sensor that is not positioned at the illustrated angle relative to an optical axis of the camera. For example, in some embodiments all sensors may be positioned in a common plane. In the illustrated embodiment, the virtual camera 320 includes the virtual sensor 321 and the virtual lens 322 associated with the virtual sensor. As will be understood, the virtual camera 320 is depicted to show the virtual sensor 321 and the virtual lens 322 corresponding to the synthetic aperture (field of view 340) of the overall array 300 generated by stitching images captured by the physical sensors 311A, 311B, and the virtual camera is not physically present in an actual construction of the array.

Each camera 310A, 310B looks at the apex A of the central mirror prism 350, the optical axis 315A, 315B of each camera 310A, 310B passing through the apex A. The lens centers of the lenses 312A, 312B associated with each of the cameras 310A, 310B are at the same distance from the apex, and each camera 310A, 310B sees half the field of view 340 of the virtual camera 320. The angle of the optical axis 315A, 315B of each camera 310A, 310B relative to the vertical axis 325 can be double the angle of a plane formed by its corresponding mirror 330, 335 relative to the vertical axis 325. In the illustrated embodiment, the vertical axis 325 denotes the vertical axis of symmetry of the array 300 and is also the virtual optical axis (e.g., the optical axis of the virtual camera 320 represented by virtual sensor 321 and virtual lens 322).

As illustrated, the planes formed by the mirror surfaces 330, 335 intersect at a common point, referred to as the apex and labeled as A in the figures, along the virtual optical axis 325 of the array. The cameras 310A, 310B can be positioned so that the optical axis 315A, 315B of each camera intersects with the apex A. In addition, each camera 310A, 310B can be positioned such that the angle (labeled as angle 2α) formed between the camera's optical axis 315A, 315B and the virtual optical axis 325 is twice the angle (labeled as angle α) formed between the corresponding mirror surface 330, 335 and the virtual optical axis 325. However, these angles do not have to be the same for all cameras in the array. The distance D between the apex A and the center of projection 313B (located within the lens 312B corresponding to a sensor 311B) can be the same or essentially the same for all the cameras in the array. All cameras 310A, 310B of the array virtually merge into (read "serve as") one single virtual camera 320 looking upward along the virtual optical axis 325 of the array 300. In this way each individual camera/lens/mirror combination represents only a sub-aperture of the total array 300. The virtual camera 320 has a synthetic aperture made of the sum of all individual aperture rays.

Figure 3C:
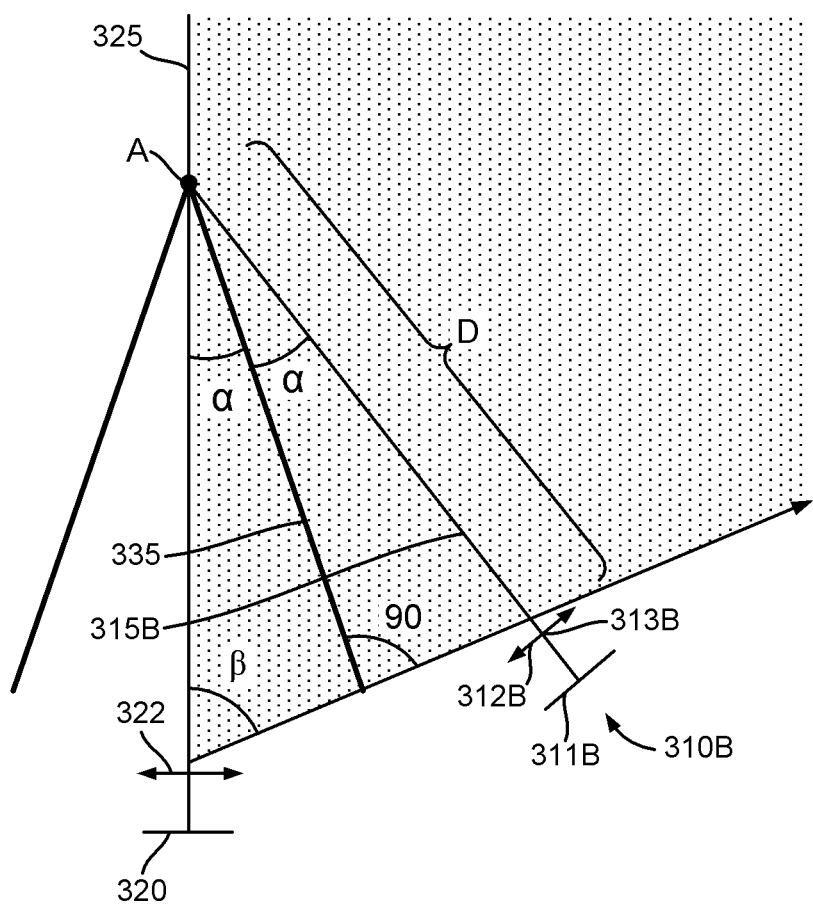

FIG. 3C illustrates an example of the above-described design constraints for one camera 310B in the array 300. The field of view 340 of the virtual camera 320 formed by stitching images from all cameras 310A, 310B in the array 300 can be based on optimization of the mechanical parameters of the system. However, a rough estimate can be obtained based on the assumption of an infinitely small (point-size) individual camera 310B. The maximum possible field of view (FOV) for the virtual camera 320 is related to angles in FIG. 3C, where:

$FOV=2\beta$ $\beta=90-\alpha$ $FOV=180-2\alpha$

Beyond the angle β, the light rays that the virtual camera 320 "sees" can be obstructed by the physical structure of the real camera 310B. In some embodiments of array cameras, the FOV may be smaller.

Additionally, the array camera is desirably thin (e.g., 4 mm or less in height) in some embodiments, which constrains the angle α to less than 45° and to more than a certain value. Other practical requirements may make α>30°. In various embodiments, the focal length and angle α do not have to be the same for all cameras.

Figure 4:
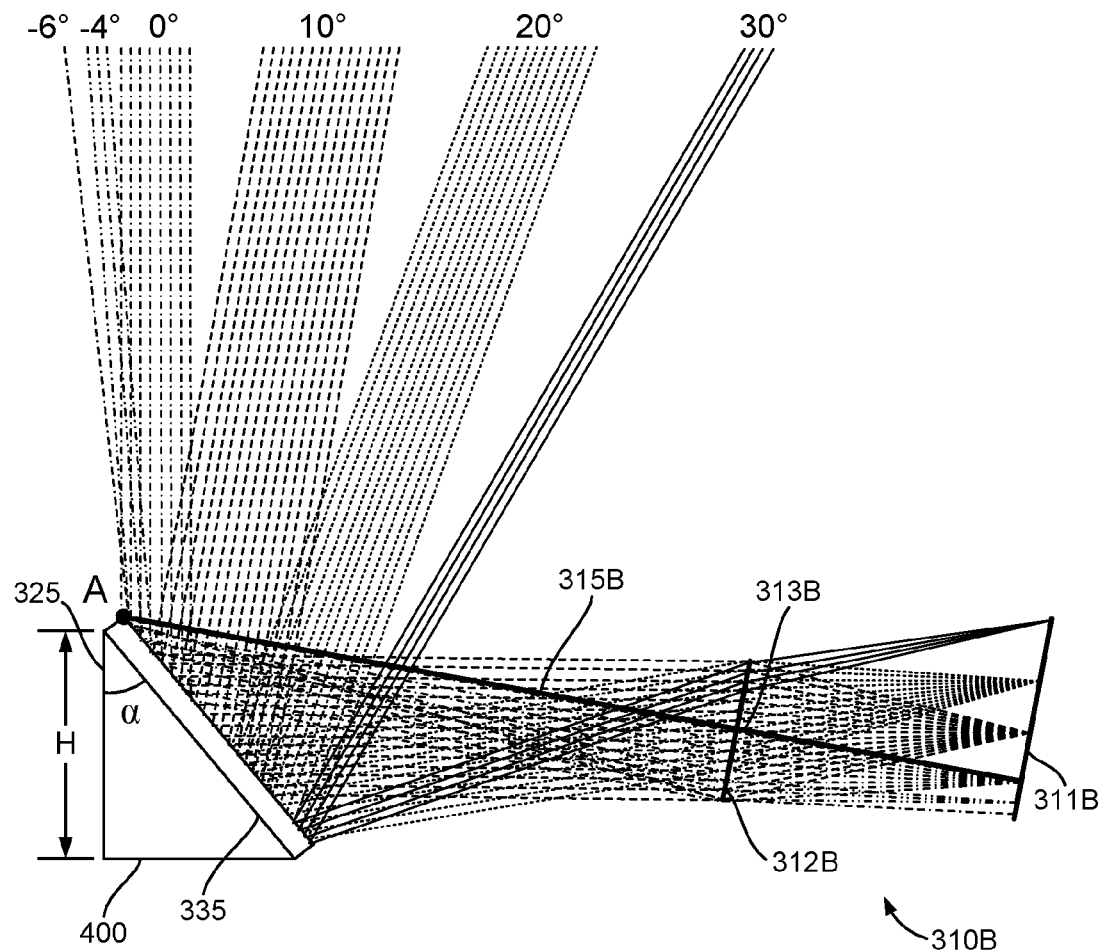
FIG. 4 illustrates an example of design parameters for one sensor and mirror of the array camera.

FIG. 4 illustrates an example of design parameters and an example ray trace for various angles of light incident on a mirror 335 corresponding to one sensor 311B and mirror 335 of the array camera 300 of FIGS. 3A-3C, which can result in a FOV=60° (approximately). However, this is an example and not a limitation and wider angles are realistically possible. Assuming an ideal lens 312B, with similar results expected for a real lens, the focal length of the camera 310B is approximately 5 mm, the aperture is 2.5 mm, the distance from A to lens 312B center of projection 313B is approximately 10.9 mm, A is at approximately 4 mm height H from the base 400 (though the height H can vary based on the overall thickness or height for the array), the lens center of projection 313B is at approximately 2 mm height from the base 400, and α=40°. A FOV=60° can be determined from computing relative illumination, and can be constrained by the mirror 335 size and distance from lens center of projection 313B to the mirror 335. The constraint of a mirror height H of approximately 4 mm may not be increased due to form factor limitations of the array camera, while the distance to the mirror 335 can be reduced, but at the cost of physical camera obstructing some of the rays. As illustrated, the sensor 311B can be positioned off-center from the optical axis 315B in order to gather light from more of the field of view provided by the mirror than if the sensor 311B was conventionally positioned centered with the optical axis 315B. In other embodiments, the sensor may be positioned in a different position and at a different angle relative to the optical axis and a secondary light redirecting surface can be included to redirect the light into the sensor. For example, the base 400 of the central mirror pyramid may be positioned on (or inset into) a substrate, and the sensor 311B (and all other sensors in the array 300) may be positioned on (or inset into) the substrate.

Figure 5B:
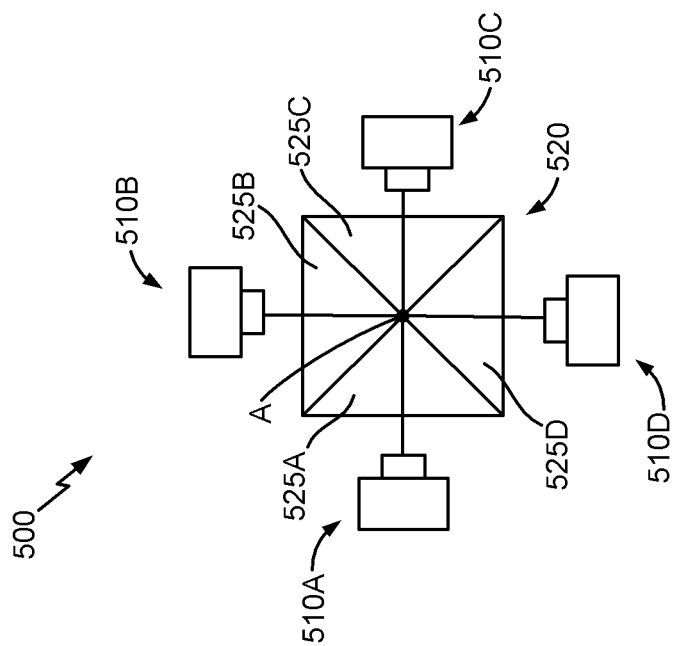
FIGS. 5A through 5C illustrate an embodiment of an array camera free of parallax and tilt artifacts.
Figure 5A:
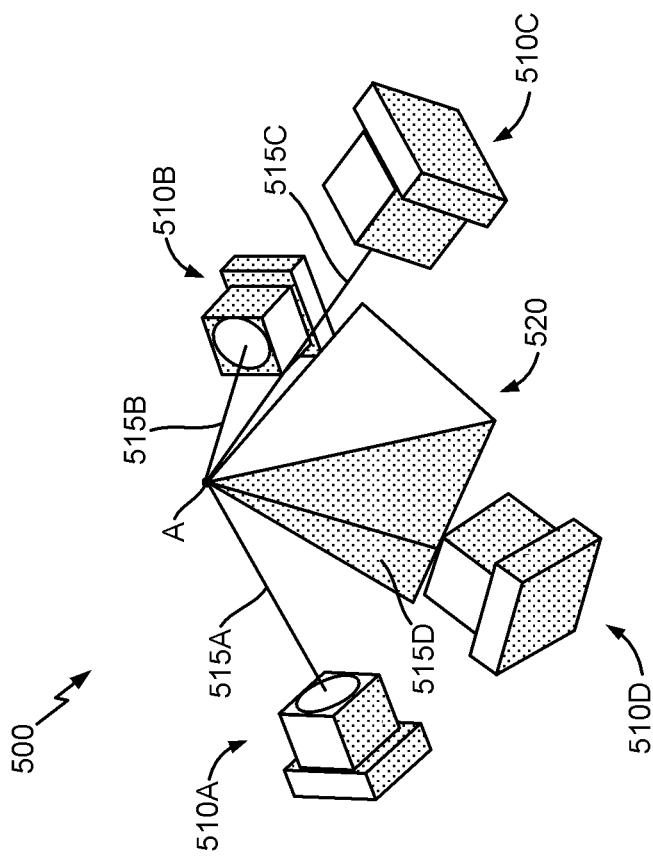
Figure 5C:
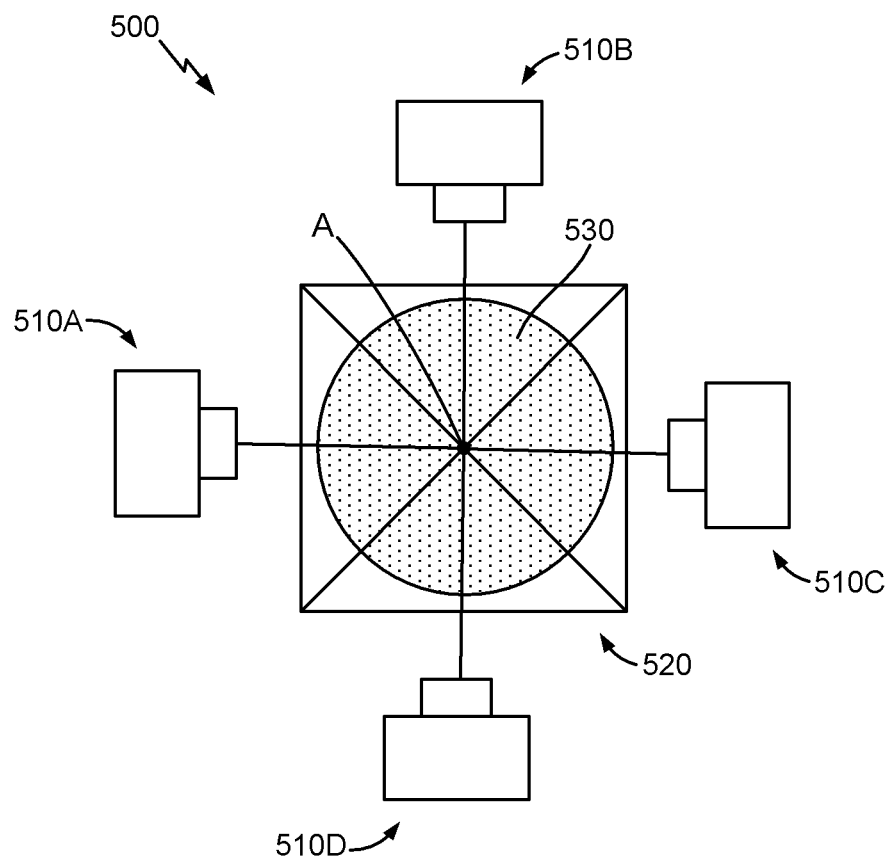

FIGS. 5A through 5C illustrate an embodiment of an array camera 500 exhibiting little or no parallax and tilt artifacts, the array camera including four sub-cameras 510A, 510B, 510C, 510D and a central mirror pyramid 520. Here, camera is used to refer to the sensor, lens, and possible secondary light redirecting surface corresponding to a facet of the central mirror pyramid 520. Each of the four cameras 510A, 510B, 510C, 510D has an optical axis intersecting the apex A of the mirror pyramid, the lens centers of projection for each camera are at the same distance from the apex, and each camera sees approximately ¼ of the field of view of the virtual camera. In some embodiments, each camera 510A, 510B, 510C, 510D can have an optical axis intersecting a common point other than the apex A. In such embodiments, the resulting image can exhibit little or no parallax artifacts but can exhibit tilt artifacts.

The central mirror pyramid 520 can include four reflective facets or mirrored surfaces 525A, 525B, 525C, 525D each directing light toward one of the four cameras 510A, 510B, 510C, 510D and forming the apex A of the pyramid. Each camera 510A, 510B, 510C, 510D can include an image sensor and lens assembly, and in some implementation a secondary light redirecting surface, represented in the figures as the two joined rectangular boxes. Each camera 510A, 510B, 510C, 510D can have an optical axis 515A, 515B, 515C, 515D passing through the apex A of the mirror pyramid, and can see, using a corresponding reflective facets 525A, 525B, 525C, 525D, a portion of the total field of view of the virtual camera. The spatial relationships between each of the cameras 510A, 510B, 510C, 510D, the apex A, and the corresponding one of reflective facets 525A, 525B, 525C, 525D can be defined as above in order to reduce or eliminate parallax and tilt artifacts. Although commonly described herein as a mirror pyramid, in some embodiments the reflective facets may form a reflecting component having a different shape, for example by being positioned a distance apart and therefore not forming a unified structure, or by being positioned together to form a reflecting component having a flat upper surface rather than a pointed apex. As such, the apex A may not be a physical point but rather a point in space representing an intersection of the planes of the facets.

Other array camera designs with optical axis alignment for parallax reductions are also possible, for example an eight camera design using four mirrors or reflective facets in addition to a central mirror pyramid (or other shape/structure of central reflective component). Other numbers of cameras and corresponding mirrored surfaces are possible. In addition, as discussed above with respect to FIG. 1, in some embodiments a second reflective surface may be positioned above or below the image sensor to reflect light from the central mirror pyramid to the sensor. Accordingly, the sensor can be mounted on a substrate with the central mirror pyramid 520, and the array camera design can accommodate sensors having a length greater than the height of the array camera.

FIG. 5C illustrates an example of the field of view 530 of the virtual camera, shown as a circle over the central mirror pyramid 520.

Figure 6C:
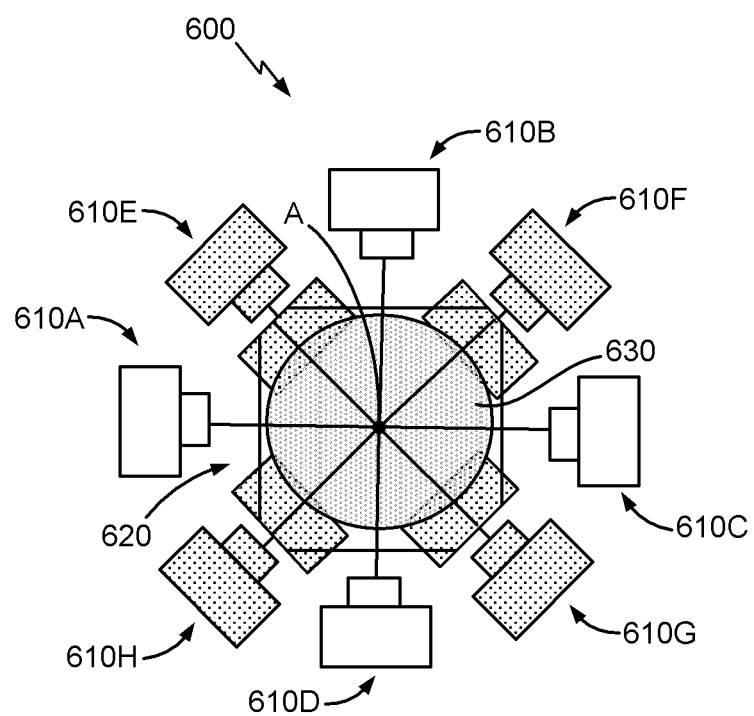

FIGS. 6A through 6C illustrate an embodiment of an array camera 600 free of parallax and tilt artifacts. Like the four-camera design 500 described above, the eight-camera array design 600 includes a central mirror pyramid 620 surrounded by an array of cameras 610A-610H. Compared to the four-camera design 500 described above this eight-camera design 600 has four additional mirrors 625E, 625F, 625G, 625H and four corresponding additional cameras 610E, 610F, 610G, 610H following the same principle of spatial relationships described above with respect to FIGS. 3A-3C regarding planes intersecting at the apex A, though the additional mirrors 625E, 625F, 625G, 625H may be positioned at different angles relative to a vertical axis of the array 600 compared to the angle of the primary mirrors 610A, 610B, 610C, 610D. The four additional mirrored surfaces 625E, 625F, 625G, 625H may be shaped by cutting off part of their usable area so that they do not obstruct the cones of rays captured by the original four cameras. The additional mirrors and cameras compared to the four-camera design are shown in gray. The distance from the lens center to the apex A can be the same for all eight cameras 610A-610H. This is meant to illustrate one example of an array camera, and other cameras with a different number of cameras/mirrors as well as other modifications are possible.

FIG. 6C illustrates an example of the field of view 630 of the virtual camera, shown as a circle over the central mirror pyramid 620. Compared to FIG. 5C, the illustrated circle 630 shows the increase in the FOV of the eight-camera array 600 compared to the four-camera array 500. More than eight-camera designs are possible for expanding the field even further, but the complexity of the system increases proportionally. Some embodiments may be constructed to achieve a FOV of approximately 100°.

IV. Overview of Example Captured Images

FIG. 7A illustrates an example of design parameters for one sensor 710 and mirror 720 of a four-camera array camera. Assuming an ideal lens 715, with similar results expected for a real lens, the focal length of the camera 310B is approximately 5 mm, the aperture is 2.5 mm, the distance from A to lens 715 center of projection 313B is approximately 7 mm, A is at approximately 4 mm height H from the base 725 (though the height H can vary based on the overall thickness or height for the array), and $\alpha=39.713°$. The constraint of a mirror height H of approximately 4 mm may not be increased in some implementations due to form factor limitations of the array camera. As illustrated, the sensor 710 can be positioned off-center from the optical axis 730 in order to gather light from more of the field of view provided by the mirror than if the sensor 710 was conventionally positioned centered with the optical axis 730. In other embodiments, the sensor 710 may be positioned in a different position and at a different angle relative to the optical axis and a secondary light redirecting surface can be included to redirect the light into the sensor. For example, the base 725 of the central mirror pyramid may be positioned on (or inset into) a substrate, and the sensor 710 (and all other sensors in the array) may be positioned on (or inset into) the substrate.

FIG. 7B illustrates an example ray trace for light incident upon the mirror 720 at various angles, where the number of lines corresponds to the relative amount of light at each angle that arrives at the sensor 710. As illustrated by the numbers of lines in the ray trace for the various angles, less light from the outer angles (e.g., −6 degrees, 0 degrees, 36 degrees, and 44 degrees) reach the sensor 710 than from the inner angles (e.g., 12 degrees and 24 degrees).

Figure 7C:
FIG. 7C illustrates a set of views captured by the array camera of FIGS. 7A and 7B.
Figure 7C:
Figure 7C:
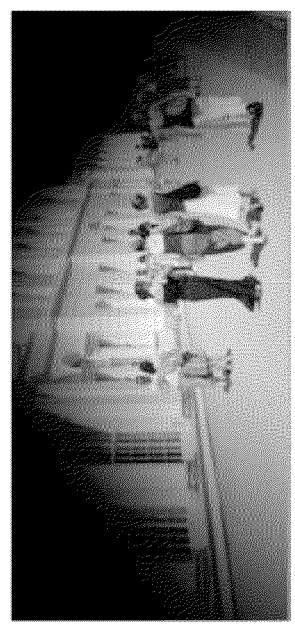
Figure 7C:

FIG. 7C illustrates a set of views captured by a four-camera array camera having the design parameters illustrated in FIGS. 7A and 7B. Simple linear blending of the images captured with the four-camera array can produce high quality results with no artifacts. The total field of view can reach 88° if overlap between the four camera fields of view is minimized. In the illustrated simulated set of views, the object is approximately 50 mm from the camera, and the camera is focused exactly on the object. There is little or no parallax in the areas of overlap between the fields of view, providing significant improvements for image stitching over previous array camera designs.

When all images are in focus, the in-focus object should preferably be at one distance, for example, in one plane. Proper aligning removes any parallax. When the depth to different objects is different, they can be neither all in focus nor all aligned at the same time. Even if one object is aligned in the overlapping views, some other object at different depth may not be aligned.

In some examples, in-focus objects will be aligned properly, however there can be misalignment between images of out of focus objects in the same scene. Extensive simulation in Zemax has shown that with such objects there is visible parallax between overlapping views from different mirrors. However the mixture of two such images is the true defocused view of the object from a larger aperture. Views from individual cameras show partial (incomplete) aperture imaging. The result of mixing such individual views is full aperture imaging. The array camera generates a synthetic aperture images from all of the partial views.

In one experiment with the four-camera array, with the in-focus object at 50 mm and cameras focused at 40 mm, the experiment revealed slight parallax in the overlapping regions between individual views. However, linear blending of the views still produced cleanness and absence of ghosting in the final image.

Figure 8B:
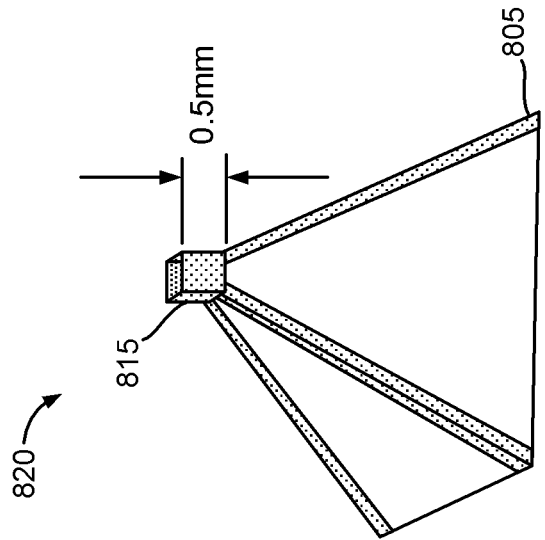
FIG. 8B illustrates another embodiment of an imperfect central mirror pyramid.
Figure 8A:
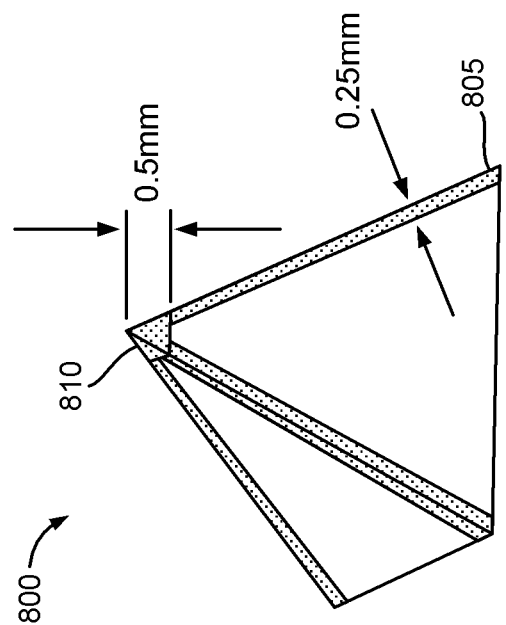
FIG. 8A illustrates an embodiment of an imperfect central mirror pyramid.

FIG. 8A illustrates an embodiment of an imperfect central mirror pyramid 800. Real mirrors used in array cameras can possibly have imperfections at the sharp edges. The mirror of FIG. 8A represents an imperfect mirror used to investigate the effect of blocking the edge 805 of the pyramid by 0.25 mm and cutting the top 810 by 0.5 mm (referred to as a mirror pyramid with cutoffs). The effects of the blocked edges 805 and cut top 810 are discussed with respect to the example image of FIG. 9A.

FIG. 8B illustrates another embodiment of an imperfect central mirror pyramid 820. The mirror of FIG. 8B represents an imperfect mirror used to investigate the effect of edges 805 blocked and also a wall 815 at the top of the pyramid, the wall 815 having a height of approximately 0.5 mm, blocking certain rays coming at an angle (referred to as a mirror pyramid with walls). The effects of the blocked edges 805 and blocked top 815 are discussed with respect to the example image of FIG. 9B.

Figure 9B:
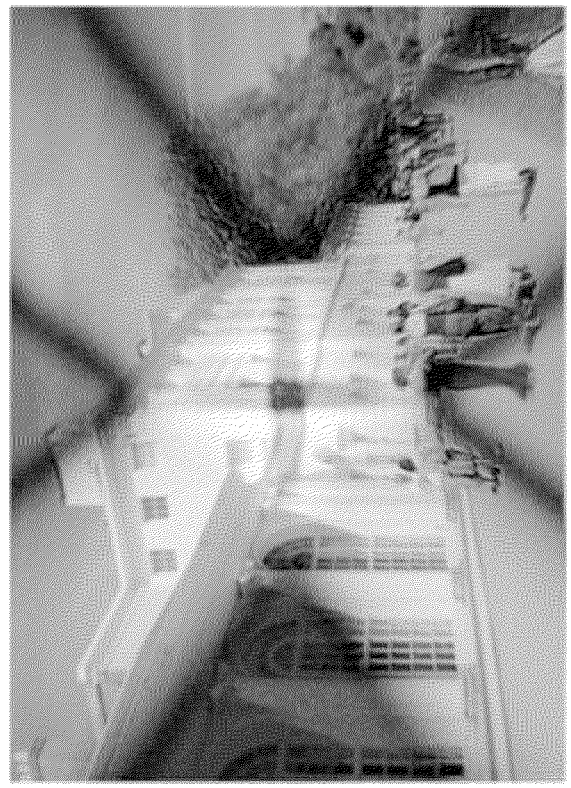
FIG. 9B illustrates a magnification of the absolute value of the difference between an image captured with an ideal central mirror pyramid and the central mirror pyramid of FIG. 8B.
Figure 9A:
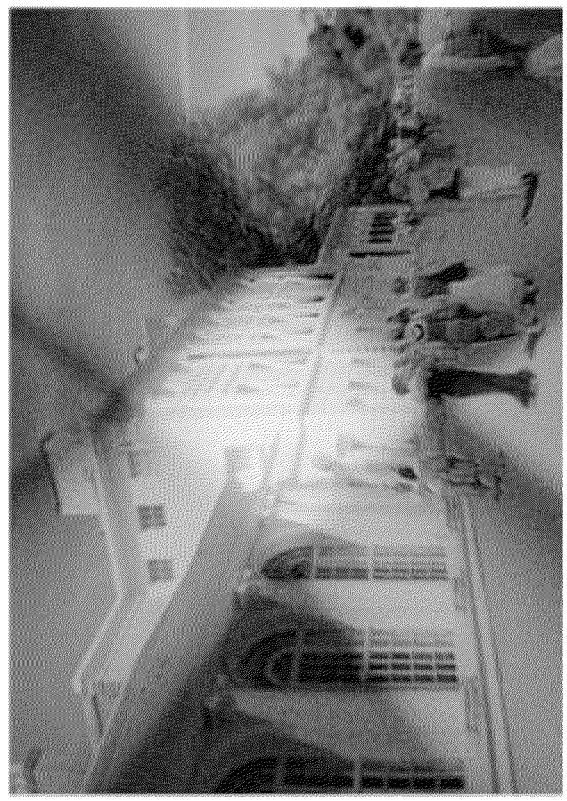
FIG. 9A illustrates a magnification of the absolute value of the difference between an image captured with an ideal central mirror pyramid and the central mirror pyramid of FIG. 8A.

FIG. 9A illustrates an image 900 with magnification of the absolute value of the difference between an image captured with an ideal central mirror pyramid and the central mirror pyramid of FIG. 8A. The effect of the cutoffs on an image captured using a central mirror pyramid as is illustrated in FIG. 8A is darkening of the image in the 45 degree diagonals and double the darkening in a diamond-shaped region in the center of the image.

FIG. 9B illustrates an image 905 with magnification of the absolute value of the difference between an image captured with an ideal central mirror pyramid and the central mirror pyramid of FIG. 8B. As illustrated by the magnified absolute value of the difference, the effect of wall on an image captured using a central mirror pyramid as is illustrated in FIG. 8B is a black cross in the center of the image.

Although real and imperfect mirrors may cause darkening in captured images, such darkening will be constant across all images capture by the array using the imperfect mirror. Accordingly, in some embodiments post-capture processing techniques can be used to correct for the known darkening of the image due to the mirror, for example by multiplying the captured image by a mask of the known darkened regions. The result would appear as if it was captured by an ideal mirror with sharp edges and a sharp apex. In other embodiments, manufacturing constraints can be placed on mirror construction to avoid darkening artifacts, for example requiring mirror edges to be precise and sharp to better than 0.25 mm.

V. Overview of Example Image Capture Process

Figure 10:
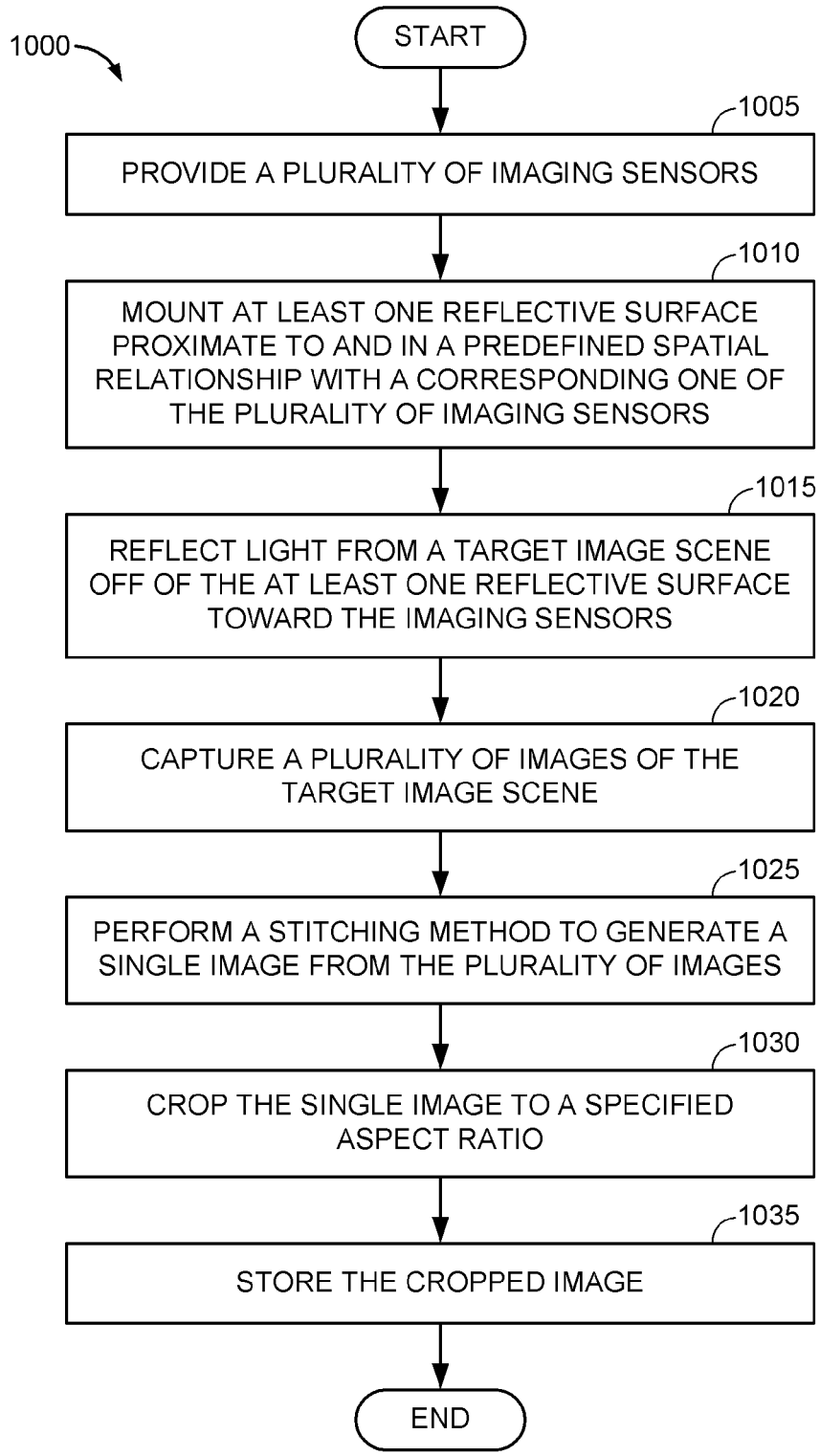
FIG. 10 illustrates an embodiment of a folded optic image capture process.

FIG. 10 illustrates an embodiment of a folded optic image capture process 1000. The process 1000 begins at block 1005, in which a plurality of imaging sensors are provided. This block can include providing any of the sensor array configurations discussed above, including number and positioning of the sensors.

The process 1000 then moves to block 1010, in which at least one reflective surface is mounted proximate to and in a predefined spatial relationship with a corresponding one of the plurality of imaging sensors. For example, this block could comprise mounting a central mirror pyramid in the middle of a surrounding array of two, four, or eight sensors, wherein the central mirror pyramid comprises a surface associated with each sensor in the arrays. As described above, the predefined spatial relationship can provide for an array camera that is substantially free of parallax and tilt artifacts, for example by specifying that all planes formed by the facets or mirrored surface of the central mirror pyramid intersect at a common point (the apex), that each mirror is positioned at an angle $\alpha$ relative to a vertical axis of the array passing through the apex (though different mirrors may be mounted at different angles or all at the same angle in various embodiments), that the corresponding sensor of each mirror is positioned at an angle $2\alpha$ relative to the vertical axis of the array passing through the apex, and that the center of projection of the lens assembly associated with each sensor is positioned the same distance D from the apex as each of the other centers of projection. In some embodiments, blocks 1005 and 1010 of process 1000 can be implemented as a method of manufacturing an array camera that is substantially free of parallax and tilt artifacts.

The process 1000 then transitions to block 1015, in which light comprising a target image of a scene is reflected off of the at least one reflective surface toward the imaging sensors of an array camera manufactured by blocks 1005 and 1010. For example, a portion of the light may be reflected off of each of a plurality of surfaces toward each of the plurality of sensors. This may further comprise passing the light through a lens assembly associated with each sensor, and may also include reflecting the light off of a second surface onto a sensor. Block 1015 may further comprise focusing the light using the lens assembly or through movement of any of the reflective surfaces.

The process 1000 may then move to block 1020, in which the sensors capture a plurality of images of the target image scene. For example, each sensor may capture an image of a portion of the scene corresponding to that sensor's field of view. Due to the predetermined spatial relationship used in constructing the array camera, the fields of view may exhibit little or no parallax and tilt artifacts. Together, the fields of view of the plurality of sensors cover at least the target image in the object space.

The process 1000 then may transition to block 1025 in which an image stitching method is performed to generate a single image from the plurality of images. In some embodiments, the image stitching module 240 of FIG. 2 may perform this block. This may include known image stitching techniques. Further, any areas of overlap in the fields of view may generate overlap in the plurality of images, which may be used in aligning the images in the stitching process. For example, block 925 may further include identifying common features in the overlapping area of adjacent images and using the common features to align the images. In some embodiments block 1025 can include compensation for known artifacts caused by imperfections in the central mirror pyramid.

Next, the process 1000 transitions to block 1030 in which the stitched image is cropped to a specified aspect ratio, for example 4:3 or 1:1. Finally, the process ends after storing the cropped image at block 1035. For example, the image may be stored as a full resolution final image in storage 210 of FIG. 2, or may be stored in working memory 205 of FIG. 2 for display as a preview image of the target scene.

VI. Implementing Systems and Terminology

Implementations disclosed herein provide systems, methods and apparatus for multiple aperture array cameras free from parallax and tilt artifacts. One skilled in the art will recognize that these embodiments may be implemented in hardware, software, firmware, or any combination thereof.

In some embodiments, the circuits, processes, and systems discussed above may be utilized in a wireless communication device. The wireless communication device may be a kind of electronic device used to wirelessly communicate with other electronic devices. Examples of wireless communication devices include cellular telephones, smart phones, Personal Digital Assistants (PDAs), e-readers, gaming systems, music players, netbooks, wireless modems, laptop computers, tablet devices, etc.

The wireless communication device may include one or more image sensors, two or more image signal processors, a memory including instructions or modules for carrying out the processes discussed above. The device may also have data, a processor loading instructions and/or data from memory, one or more communication interfaces, one or more input devices, one or more output devices such as a display device and a power source/interface. The wireless communication device may additionally include a transmitter and a receiver. The transmitter and receiver may be jointly referred to as a transceiver. The transceiver may be coupled to one or more antennas for transmitting and/or receiving wireless signals.

The wireless communication device may wirelessly connect to another electronic device (e.g., base station). A wireless communication device may alternatively be referred to as a mobile device, a mobile station, a subscriber station, a user equipment (UE), a remote station, an access terminal, a mobile terminal, a terminal, a user terminal, a subscriber unit, etc. Examples of wireless communication devices include laptop or desktop computers, cellular phones, smart phones, wireless modems, e-readers, tablet devices, gaming systems, etc. Wireless communication devices may operate in accordance with one or more industry standards such as the 3rd Generation Partnership Project (3GPP). Thus, the general term "wireless communication device" may include wireless communication devices described with varying nomenclatures according to industry standards (e.g., access terminal, user equipment (UE), remote terminal, etc.).

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It should be noted that the terms "couple," "coupling," "coupled" or other variations of the word couple as used herein may indicate either an indirect connection or a direct connection. For example, if a first component is "coupled" to a second component, the first component may be either indirectly connected to the second component or directly connected to the second component. As used herein, the term "plurality" denotes two or more. For example, a plurality of components indicates two or more components.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

In the foregoing description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

Headings are included herein for reference and to aid in locating various sections. These headings are not intended to limit the scope of the concepts described with respect thereto. Such concepts may have applicability throughout the entire specification.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. A system configured to form an image of a target scene, comprising:
    a refractive prism including a plurality of primary light redirecting surfaces and an apex located at an intersection of each of the plurality of primary light redirecting surfaces; and
    a plurality of cameras, each including an optical axis aligned to intersect at the apex of the refractive prism and including an image sensor associated with a respective one of the plurality of primary light redirecting surfaces, the image sensor configured to:
        receive incoming light from the target scene that is redirected from the respective one of the primary light redirecting surfaces; and
        capture an image of a portion of the target scene, wherein the refractive prism is disposed between at least two of the plurality of cameras.

2. The system of claim 1, further comprising a virtual optical axis passing through the apex, wherein:
    at least one of the plurality of primary light redirecting surfaces is positioned such that a plane formed by the at least one of the plurality of primary light redirecting surfaces relative to the virtual optical axis forms a first angle; and
    the optical axis of one of the plurality of cameras that receives light from the at least one of the plurality of primary light redirecting surfaces forms a second angle relative to the virtual optical axis, the second angle having a value that is double a value of the first angle.

3. The system of claim 2, wherein planes formed by each of the plurality of primary light redirecting surfaces form the first angle relative to the virtual optical axis.

4. The system of claim 2, wherein:
    planes formed by a first subset of the plurality of primary light redirecting surfaces form the first angle relative to the virtual optical axis; and
    planes formed by a second subset of the plurality of primary light redirecting surfaces form a third angle relative to the virtual optical axis, the third angle having a value different than the value of the first angle.

5. The system of claim 1, wherein at least one camera of the plurality of cameras comprises a lens assembly and a sensor, wherein:
    the optical axis of the at least one camera intersects with a center of projection of the lens assembly, and
    the optical axis of the at least one camera intersects with the sensor at a location offset from a center of the sensor.

6. The system of claim 1, wherein each of the plurality of cameras comprises a respective one of a plurality of lens assemblies.

7. The system of claim 6, wherein each of the plurality of lens assemblies includes a center of projection and at least two of the plurality of lens assemblies are positioned such that the apex is equidistant from the center of projection of each of the at least two of the plurality of lens assemblies.

8. The system of claim 6, wherein the plurality of lens assemblies are positioned equidistant from the apex.

9. The system of claim 6, further comprising a substrate upon which the image sensors are positioned.

10. The system of claim 9, wherein each of the image sensors is inset into the substrate.

11. The system of claim 10, wherein the substrate is flat.

12. The system of claim 11, wherein all of the image sensors are disposed on one plane in the substrate.

13. The system of claim 10, further comprising a plurality of secondary light redirecting surfaces.

14. The system of claim 13, wherein each of the plurality of secondary light redirecting surfaces is configured to:
    receive at least a first portion of incoming light from a corresponding one of the plurality of lens assemblies; and
    redirect at least a second portion the incoming light to a corresponding one of the plurality of image sensors.

15. The system of claim 13, wherein the plurality of secondary light redirecting surfaces comprise surfaces of the refractive prism.

16. A method of manufacturing a folded optic array camera configured to form an image of a target scene, the method comprising:
    providing a refractive prism including a plurality of primary light redirecting surfaces and an apex located at an intersection of planes formed by each of the plurality of primary light redirecting surfaces; and
    arranging a plurality of cameras around the refractive prism such that the refractive prism is disposed between at least two of the plurality of cameras, each of the plurality of cameras including an image sensor associated with a respective one of the plurality of light redirecting surfaces and configured to capture an image of a portion of the target scene, wherein the arranging comprises, for each camera of the plurality of cameras:
positioning a lens assembly having an optical axis to receive a portion of light representing the target scene from a respective one of the plurality of primary light redirecting surfaces;
positioning the lens assembly such that the optical axis is aligned to intersect with the apex, and
positioning the image sensor to receive light from the lens assembly.

17. The method of claim 16, further comprising:
positioning the image sensor such that the optical axis intersects the image sensor at a position offset from a center of the image sensor.

18. The method of claim 16, further comprising:
arranging the plurality of cameras within a housing having an interior height no greater than 4.5 mm.

19. The method of claim 16, further comprising:
positioning lens assemblies of at least two of the plurality of cameras to be equidistant from the apex.

20. The method of claim 16, wherein the folded optic array camera comprises a virtual optical axis of a virtual camera, the virtual camera formed by combining a field of view of each of the plurality of cameras.

21. The method of claim 20, further comprising:
positioning one of the plurality of primary light redirecting surfaces at a first angle relative to the virtual optical axis; and
positioning the lens assembly of a corresponding one of the plurality of cameras at a second angle relative to the virtual optical axis, the second angle having a value that is double a value of the first angle.

22. The method of claim 16, further comprising:
providing a substrate;
disposing the refractive prism on the substrate or within an aperture of the substrate; and
for each of the plurality of cameras, providing an image sensor positioned to receive light from the lens assembly, and positioning the image sensor on the substrate.

23. The method of claim 22, further comprising, for each of the plurality of cameras:
providing a secondary light redirecting surface between the lens assembly and the image sensor, the secondary light redirecting surface configured to receive the portion of light representing the target scene from the lens assembly and to redirect the portion of light toward the image sensor.

24. The method of claim 16, further comprising:
electrically coupling each of the plurality of cameras to a processor configured to assemble data representing the portion of light of each of the plurality of cameras into a complete image of the target scene.

25. The method of claim 16, further comprising:
providing a substrate;
disposing the refractive prism on the substrate or within an aperture of the substrate; and
for each of the plurality of cameras:
providing one or more image sensors positioned to receive light from the lens assembly; and
positioning the one or more image sensors into the substrate.

26. The method of claim 25, wherein the substrate is flat.

27. The method of claim 25, wherein more than one of the one or more image sensors are mounted on one plane on the substrate.

* * * * *